US012282670B2

(12) United States Patent
Fujii et al.

(10) Patent No.: US 12,282,670 B2
(45) Date of Patent: Apr. 22, 2025

(54) STORAGE SYSTEM AND STORAGE MANAGEMENT METHOD

(71) Applicant: HITACHI, LTD., Tokyo (JP)

(72) Inventors: Hiroki Fujii, Tokyo (JP); Yoshinori Ohira, Tokyo (JP); Takeru Chiba, Tokyo (JP); Yoshiaki Deguchi, Tokyo (JP)

(73) Assignee: HITACHI VANTARA, LTD., Yokohama (JP)

( * ) Notice: Subject to any disclaimer, the term of this patent is extended or adjusted under 35 U.S.C. 154(b) by 406 days.

(21) Appl. No.: 17/495,941

(22) Filed: Oct. 7, 2021

(65) Prior Publication Data

US 2022/0027070 A1  Jan. 27, 2022

Related U.S. Application Data

(63) Continuation of application No. 17/022,810, filed on Sep. 16, 2020, now Pat. No. 11,150,820.

(30) Foreign Application Priority Data

Dec. 17, 2019  (JP) .................................. 2019-227457

(51) Int. Cl.
  G06F 3/00   (2006.01)
  G06F 3/06   (2006.01)
(52) U.S. Cl.
  CPC .......... *G06F 3/0631* (2013.01); *G06F 3/0604* (2013.01); *G06F 3/0619* (2013.01); *G06F 3/0646* (2013.01); *G06F 3/0665* (2013.01); *G06F 3/0689* (2013.01)

(58) Field of Classification Search
  CPC .... G06F 3/0631; G06F 3/0604; G06F 3/0619; G06F 3/0646; G06F 3/0665; G06F 3/0689
  See application file for complete search history.

(56) References Cited

U.S. PATENT DOCUMENTS

| 10,162,548 B2 | 12/2018 | Robins et al. |
| 10,310,752 B1 | 6/2019 | Li et al. |
| 10,852,966 B1 | 12/2020 | Liu et al. |

(Continued)

FOREIGN PATENT DOCUMENTS

| JP | 52-056149 B2 | 8/2013 |
| WO | 2014/115320 A1 | 1/2017 |
| WO | 2017/175285 A1 | 11/2018 |

OTHER PUBLICATIONS

Dell EMC Unity: Dynamic Pools, pp. 1-31, Jan. 2019.

*Primary Examiner* — Craig S Goldschmidt
(74) *Attorney, Agent, or Firm* — Volpe Koenig

(57) ABSTRACT

Provided is a storage system and a storage management method, aiming at reducing data movement amount necessary for using an expanded capacity in a distributed RAID. When only A (A is a positive integer) physical storage drives are added, a storage controller selects virtual parcels that are mapped to different physical storage drives among N physical storage drives and are included in different virtual chunks, changes an arrangement of the selected virtual parcels to the added A physical storage drives, and constitutes a new chunk based on unallocated virtual parcels selected from different physical storage drives among the (N+A) physical storage drives.

9 Claims, 31 Drawing Sheets

(56) References Cited

U.S. PATENT DOCUMENTS

| | | |
|---|---|---|
| 2007/0130424 A1 | 6/2007 | Hashimoto et al. |
| 2013/0003211 A1 | 1/2013 | Kawaguchi |
| 2015/0324145 A1 | 11/2015 | Akutsu et al. |
| 2015/0373105 A1 | 12/2015 | Okada et al. |
| 2017/0024142 A1* | 1/2017 | Watanabe ............ G06F 3/0608 |
| 2018/0081757 A1 | 3/2018 | Chiba et al. |
| 2020/0057563 A1 | 2/2020 | Chiba et al. |

* cited by examiner

FIG. 10

| Pool# | VPG# | THE NUMBER OF ALLOCATABLE VCHUNKS | THE NUMBER OF ALLOCATABLE VPG PAGES |
|---|---|---|---|
| 0 | 0 | 16 | 64 |
| | ... | ... | |
| | 3 | 16 | 64 |
| | 8 | 16 | 64 |
| | ... | ... | |
| | 23 | 4 | 16 |
| | 32 | 16 | 64 |
| | ... | ... | |
| | 63 | 8 | 32 |
| 1 | 96 | 16 | 128 |
| | ... | ... | |
| | 127 | 12 | 96 |
| POOL MANAGEMENT TABLE 802 | | | |

FIG. 15A

| VPG# | DPG# |
|---|---|
| 0 | 0 |
| 1 | 0 |
| 2 | 0 |
| 3 | 0 |
| 4 | 0 |
| 5 | 0 |
| 6 | 1 |
| PG MAPPING (V2P) TABLE 807 | |

1501 1502

FIG. 16
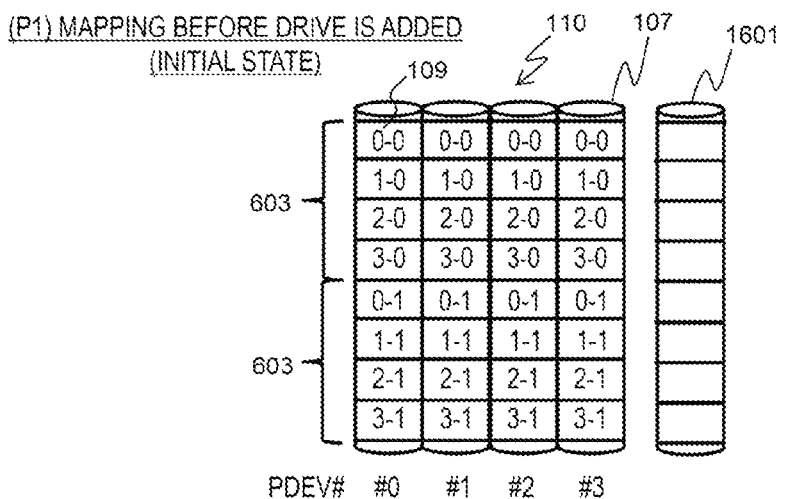
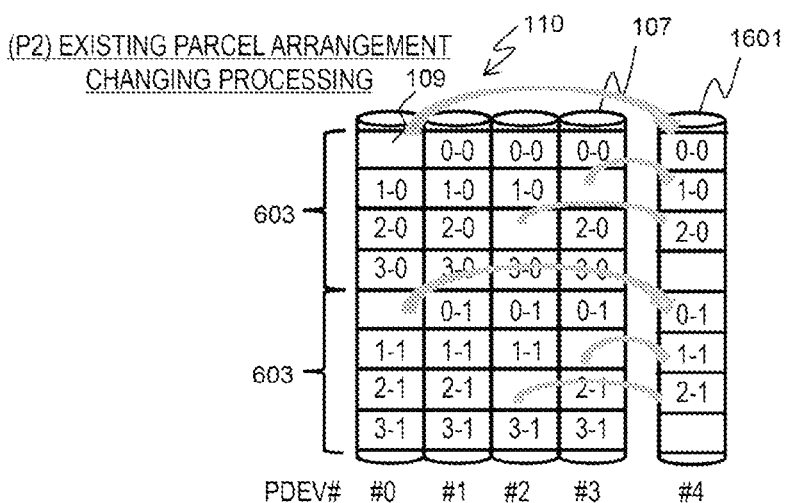
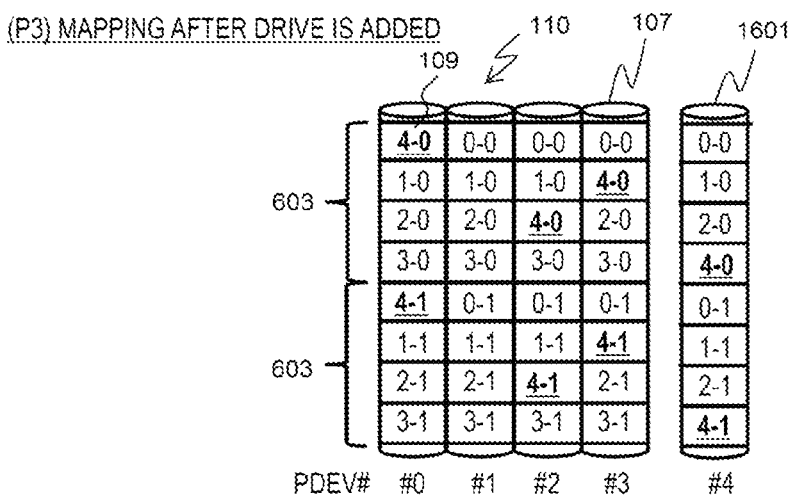

FIG. 23
(P2) EXISTING PARCEL ARRANGEMENT
CHANGING PROCESSING
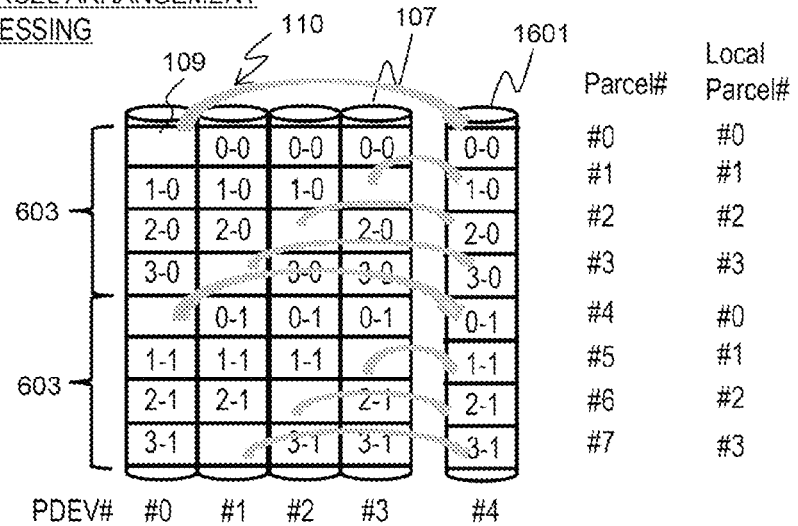
(P3) MAPPING AFTER DRIVE IS ADDED
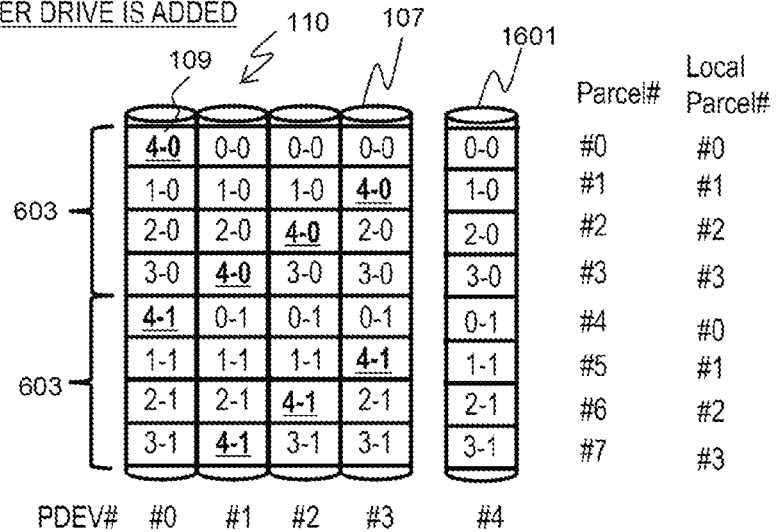

FIG. 24
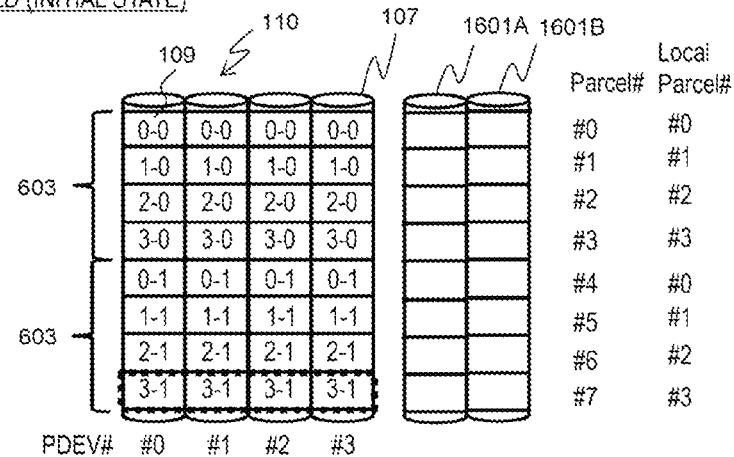
(P1) MAPPING BEFORE PLURALITY OF DRIVES ARE ADDED (INITIAL STATE)
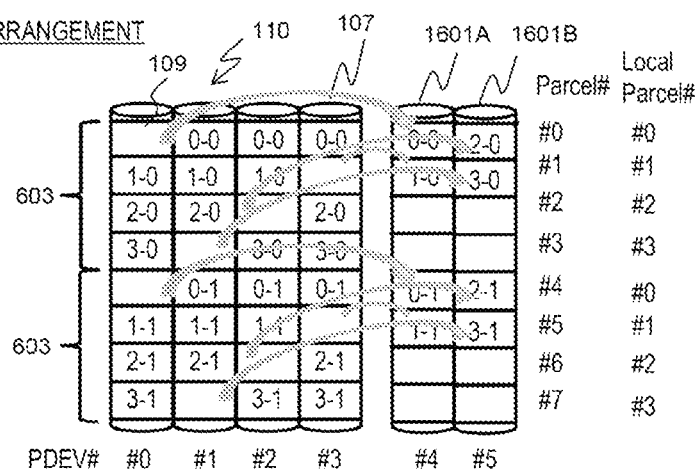
(P2) EXISTING PARCEL ARRANGEMENT CHANGING PROCESSING
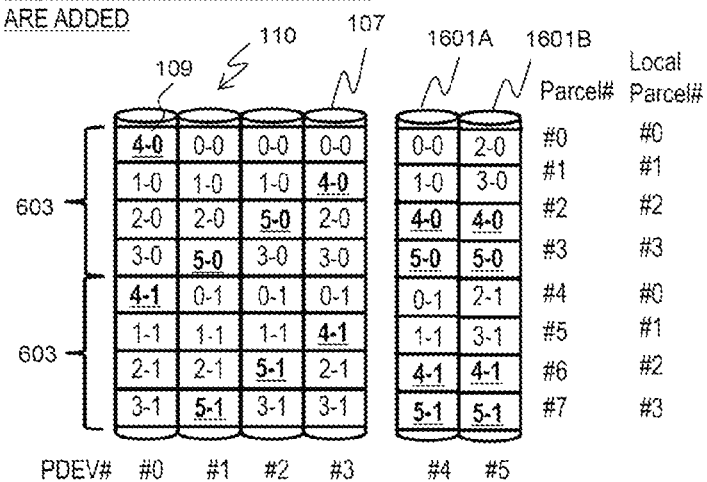
(P3) MAPPING AFTER TWO DRIVES ARE ADDED FIG. 27
(P1) MAPPING BEFORE PLURALITY OF DRIVE ARE ADDED (INITIAL STATE)
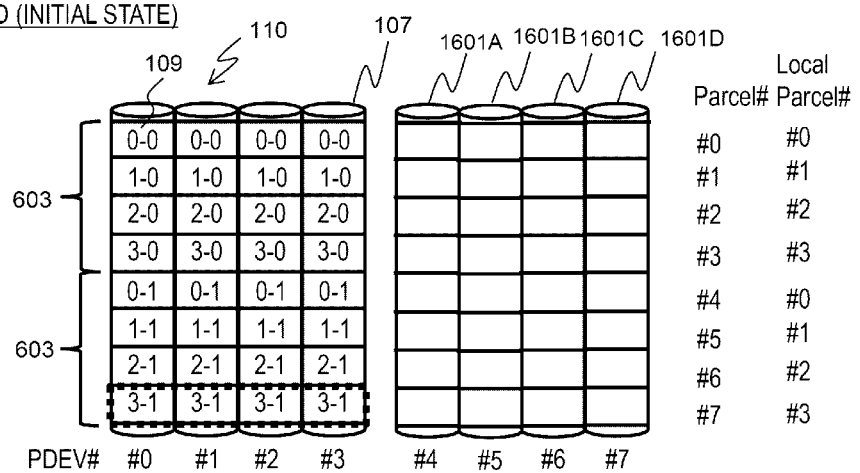
(P2) TEMPORARY MAPPING PATTERN
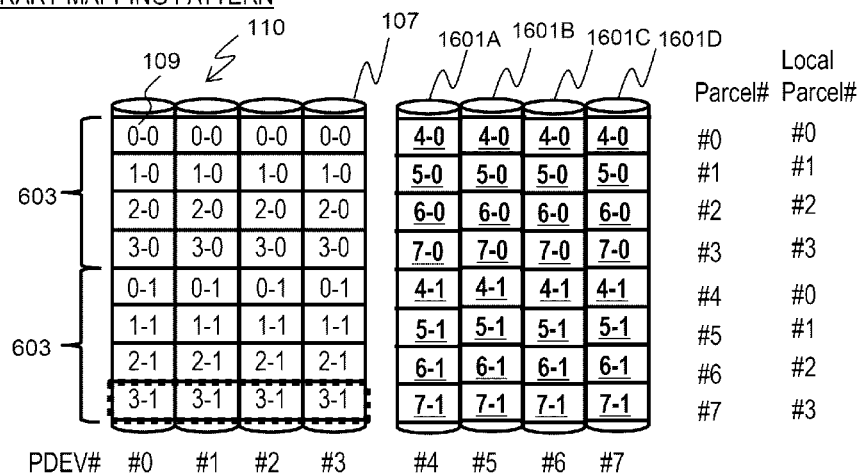
(P3) FINAL MAPPING AFTER ADDING
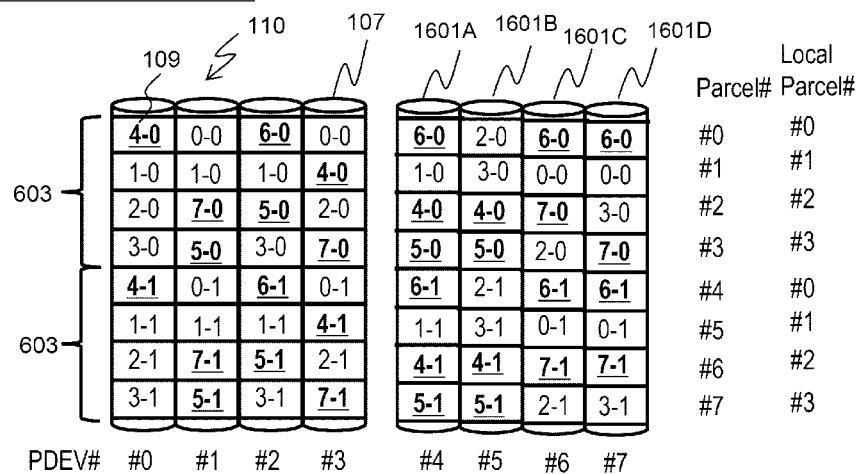

STORAGE SYSTEM AND STORAGE MANAGEMENT METHOD

CROSS-REFERENCE TO RELATED APPLICATION

This application is a continuation of U.S. patent application Ser. No. 17/022,810, filed Sep. 16, 2020, which claims the benefit of Japanese Patent Application JP 2019-227457, filed Dec. 17, 2019, which are incorporated by reference as if fully set forth.

BACKGROUND OF THE INVENTION

1. Field of the Invention

The present invention relates to a storage system and a storage management method.

2. Description of the Related Art

There is known a storage system that constitutes a Redundant Array of Inexpensive (or Independent) Disk (RAID) group by a plurality of storage devices and provides a logical volume created based on the RAID group to a higher-level device (for example, a host computer).

As a technique related to RAID, WO 2014/115320 (Patent Literature 1) discloses a distributed RAID method, which is a technique for distributing and managing stripe columns including normal data and redundant data for restoring the normal data to a plurality of storage devices that provide a storage region for a capacity pool.

However, in the related art, in a case of increasing the number of drive groups that constitute the distributed RAID for the purpose of increasing capacity and the like, expansion is possible only in Parity Group (PG) units. Therefore, when the distributed RAID is constituted using a storage device such as a large-capacity Solid State Drive (SSD), it is possible to expand only with an excess capacity than the required capacity. In addition, in order to secure redundancy of data to be stored after expansion, it is necessary to move data from an existing drive group to an expansion drive group, which requires a long time for the expansion.

The invention has been made in view of the above circumstances, and an object of the invention is to provide a storage system and a storage management method capable of reducing a data movement amount necessary for using the expanded capacity in a distributed RAID.

SUMMARY OF THE INVENTION

In order to achieve the above object, a storage system according to the first aspect is a storage system including a processor, and a plurality of physical storage drives. The processor is configured to constitute a virtual chunk with K (K is an integer of 2 or more) virtual parcels each having user data or element data that is redundant data for repairing the user data, and respectively map virtual parcels included in the same virtual chunk to different physical storage drives. When constituting a new chunk, the processor is configured to select virtual parcels, move the virtual parcels between the physical storage drives, and constitute the new chunk by respectively allocating the virtual parcels to a plurality of unallocated regions that are obtained by moving the virtual parcels and that are located in different physical storage drives.

According to the invention, it is possible to reduce the data movement amount necessary for using the expanded capacity in the distributed RAID.

BRIEF DESCRIPTION OF THE DRAWINGS

FIG. 10 is a diagram showing an example of a pool management table of FIG. 8;

FIG. 15A is a diagram showing an example of a PG mapping table of FIG. 8;

FIG. 16 is a block diagram showing an example of a parcel mapping method when one physical storage drive used in the storage system of FIG. 2 is added;

FIG. 23 is a block diagram showing a parcel mapping method when one physical storage drive used in a storage system according to a second embodiment is added;

FIG. 24 is a block diagram showing a parcel mapping method when a plurality of physical storage drives used in a storage system according to a third embodiment are added;

FIG. 27 is a block diagram showing a parcel mapping method when a plurality of physical storage drives used in a storage system according to a fourth embodiment are added;

DESCRIPTION OF THE PREFERRED EMBODIMENTS

Embodiments will be described with reference to the drawings. It should be noted that the embodiments described below do not limit the invention according to the claims, and all of the elements and combinations thereof described in the embodiments are not necessarily essential to the solution to the problem of the invention.

In the following description, various types of information is described in the expression of "aaa table", but the various types of information may be expressed with a data structure other than a table. The "aaa table" may also be called "aaa information" to show that it does not depend on the data structure.

In the following description, the processing is described using a "program" as a subject, since the program is executed by a processor (for example, a central processing unit (CPU)) performing determined processing appropriately using a memory resource (for example, a memory) and/or a communication interface device (for example, a port), the subject of the process may be the program. The processing described using the program as a subject may be processing performed by a processor or a computer including the processor (for example, a management computer, a host computer, and a controller). A controller (storage controller) may be the processor itself, or may include a hardware circuit which performs a part or all of the processing performed by the controller. The programs may be installed on each controller from program sources. The program source may be, for example, a program distribution server or a computer readable storage medium.

In the following description, an ID is used as identification information of an element, but instead of the ID or in addition to the ID, other types of identification information may be used.

Further, in the following description, when the same kind of elements are not distinguished from each other, a reference sign numeral or a common number in the reference sign numeral is used, and when the same kind of elements are distinguished, the reference sign numeral of the element may be used, or an ID assigned to the element may be used instead of the reference sign numeral.

In the following description, an input/output (I/O) request is a write request or a read request, and may be referred to as an access request. A RAID group may be referred to as a parity group (PG).

Figure 1:
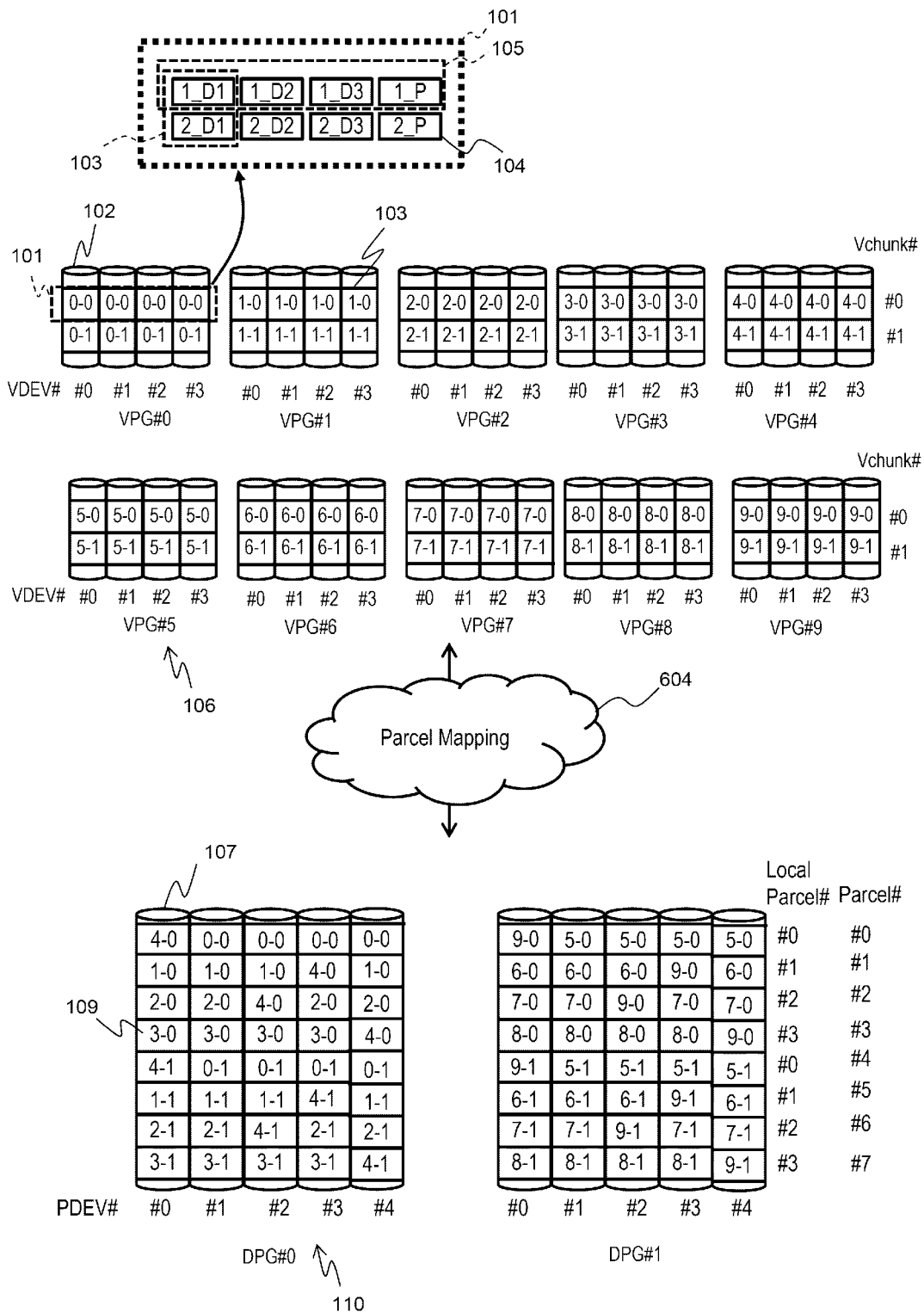
FIG. 1 is a block diagram showing an example of a parcel mapping between a virtual storage region and a physical storage region managed by a storage system according to a first embodiment.

FIG. 1 is a block diagram showing an example of a parcel mapping between a virtual storage region and a physical storage region managed by a storage system according to a first embodiment.

In FIG. 1, a storage system manages virtual storage drives (VDEVs) 102 and physical storage drives (PDEVs) 107.

The virtual storage drive 102 provides a virtual storage region. The virtual storage region is, for example, a page. The physical storage drive 107 provides a physical storage region. The storage system maps the virtual storage region to the physical storage region based on a parcel mapping 604.

The storage system provides a virtual volume to a host and allocates the virtual storage region provided by the virtual storage drive 102 to the virtual volume. At this time, the storage system constitutes a RAID group by a plurality of virtual storage drives 102, and creates the virtual volume based on the RAID group.

Further, the storage system constitutes a virtual parity group (VPG) 106 including the plurality of virtual storage drives 102. VPG # is given to each virtual parity group 106. The VPG # is an identifier of the virtual parity group 106. The number of virtual storage drives 102 included in each virtual parity group is equal to a RAID width K. The RAID width K may be referred to as a VPG drive number.

In the example of FIG. 1, four virtual storage drives 102 constitute one virtual parity group 106. At this time, the RAID width K is 4. In the example of FIG. 1, 40 virtual storage drives 102 and 10 virtual parity groups 106 each being constituted by four virtual storage drives 102 are shown.

In addition, VDEV # indicating a position in the virtual parity group 106 is given to each of the virtual storage drives 102 belonging to each virtual parity group 106. In the example of FIG. 1, a different VDEV # is given to each of the four virtual storage drives 102 in each virtual parity group 106.

The virtual parity group 106 is a RAID group and stores a redundant data set extending across the plurality of virtual storage drives 102. The redundant data set is a data set for rebuilding data in the RAID. The redundant data set includes data D from the host and parity P based on the data D. The data D may be referred to as user data. The parity P may be referred to as redundant data.

The virtual storage region is divided into virtual stripes 104 of a predetermined size. The virtual stripes 104 of a specified logical address in each of the plurality of virtual storage drives 102 in the virtual parity group 106 constitute a virtual stripe column 105. The number of virtual stripes 104 included in one virtual stripe column 105 is equal to the RAID width K.

In the example of FIG. 1, four virtual stripes 104 constitute one virtual stripe column 105. The virtual stripe column 105 stores a redundant data set therein. Each virtual stripe 104 in one virtual stripe column 105 stores the data D or the parity P in a corresponding redundant data set. The data stored in each virtual stripe 104 in the redundant data set may be referred to as element data.

In one virtual storage drive 102, one virtual stripe 104 or a predetermined number of virtual stripes 104 having consecutive logical addresses constitutes one virtual parcel 103.

In the example of FIG. 1, two virtual stripes 104 having consecutive logical addresses constitute one virtual parcel 103.

Further, a predetermined number of virtual stripe columns 105 having consecutive logical addresses constitute a virtual chunk (also referred to as Vchunk) 101. The virtual chunk 101 is one virtual parcel column. The number of virtual parcels 103 included in one virtual chunk 101 is equal to the RAID width K.

The virtual parcel column is constituted by the virtual parcels 103 of specified logical addresses in the respective virtual storage drives 102 in one virtual parity group 106. In other words, one virtual chunk 101 is constituted by B (B is a positive integer) virtual stripe columns 105 having consecutive logical addresses.

In the example of FIG. 1, one virtual chunk 101 is constituted by two virtual stripe columns 105 having consecutive logical addresses. In the example of FIG. 1, 20 virtual chunks 101 are shown, and Vchunk # in the VPG 106 is given to each virtual chunk 101. When the virtual parcel 103 includes one virtual stripe 104, the virtual chunk 101 is constituted by one virtual stripe column 105.

In the example of FIG. 1, a pair of numbers written in each virtual parcel 103 is a Vchunk identifier represented by VPG # and Vchunk #. The Vchunk identifier specifies the virtual chunk 101 to which the virtual parcels 103 belong. For example, four virtual parcels 103 each having a Vchunk identifier "0-1" indicate that the four virtual parcels 103 belong to the virtual chunk 101 represented by VPG #=0 and Vchunk #=1. At this time, the four virtual parcels 103 each having the Vchunk identifier "0-1" are included in the same virtual chunk.

The virtual storage region is mapped to the physical storage region provided by the physical storage drive 107. The mapping between the virtual storage region and the physical storage region may be referred to as the parcel mapping 604. The storage system includes distributed parity group (DPGs) 110 each including a plurality of physical storage drives 107. DPG # is provided to each distributed parity group 110. DPG # is an identifier of the distributed parity group 110.

In the example of FIG. 1, 10 physical storage drives 107 and two distributed parity groups 110 in which one distributed parity group 110 is constituted by five physical storage drives 107 are shown. PDEV # (Physical DEVice) indicating a position in the distributed parity group 110 is given to each of the physical storage drives 107 belonging to each distributed parity group 110. In the example of FIG. 1, five physical storage drives 107 are shown in each distributed parity group 110, and a different PDEV # is given to each physical storage drive 107.

Each virtual parcel 103 in the virtual chunk 101 is mapped to a physical parcel 109 in the physical storage region. Numbers in each physical parcel 109 indicate the Vchunk identifier (VPG # and Vchunk #) to which the corresponding virtual parcel 103 belongs. In the example of FIG. 1, eight physical parcels 109 are shown for each physical storage drive 107, and Parcel # is given to each physical parcel 109. Each physical parcel 109 is identified by Parcel #, PDEV # and DPG #.

In the example of FIG. 1, the plurality of virtual parcels 103 in the virtual chunk 101 are mapped to a plurality of different physical storage drives 107 for failure recovery. In other words, the plurality of virtual stripes 104 in the virtual stripe column 105 are also mapped to the plurality of different physical storage drives 107. Accordingly, the redundant data set includes the element data (the data D or the data P) of the number of physical storage drives in the distributed parity group 110, which are respectively written to the physical storage drives 107 of the number of physical storage drives in the distributed parity group 110.

The parcel mapping satisfies a mapping condition. The mapping condition is that each virtual chunk 101 is mapped to the plurality of physical storage drives 107. In other words, the mapping condition is that the plurality of physical parcels 109 in one physical storage drive 107 are not mapped to the same virtual chunk 101.

Figure 2:
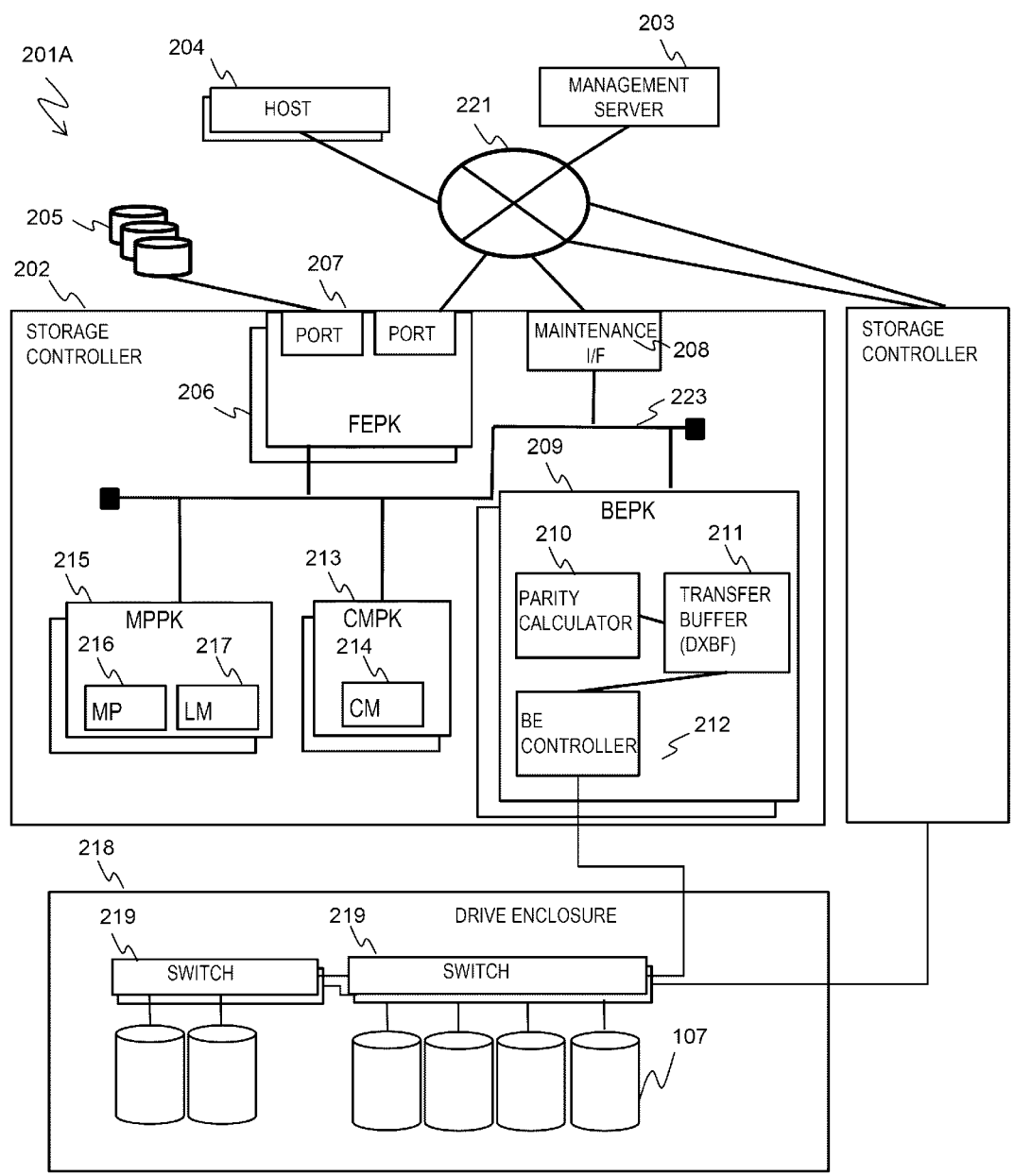
FIG. 2 is a block diagram showing a hardware configuration example of a computer system to which the storage system according to the first embodiment is applied.

FIG. 2 is a block diagram showing a hardware configuration example of a computer system to which the storage system according to the first embodiment is applied.

In FIG. 2, a computer system 201A includes one or more host computers (hereinafter, referred to as hosts) 204, a management server 203, one or more storage controllers 202, and a drive enclosure 218. The host 204, the management server 203, and the storage controllers 202 are connected via a network 221. The drive enclosure 218 is connected to the storage controllers 202.

The network 221 may be a local area network (LAN) such as WiFi or Ethernet (registered trademark), a wide area network (WAN) such as the Internet, or a combination of the WAN and the LAN. The host 204 and the storage controller 202 may be one computer. Further, each of the host 204 and the storage controller 202 may be a virtual machine.

The host 204 is, for example, a computer that executes an application, reads data used by the application from the storage controller 202, and writes the data created by the application to the storage controller 202.

The management server 203 is a computer used by an administrator. The management server 203 may include an input device for inputting information and an output device for displaying information. The management server 203 receives a setting of a type of data restoration processing for restoring data by an operation of the administrator on the input device, and sets the received data restoration processing to be executed by the storage controller 202.

The storage system includes, for example, the storage controller 202 and the drive enclosure 218. The drive enclosure 218 includes the plurality of physical storage drives 107 (also simply referred to as drives) and switches 219. The physical storage drive 107 is, for example, a magnetic disk drive, a solid state drive (SSD), a flash memory, or another nonvolatile semiconductor memory (such as a PRAM or a ReRAM). The switch 219 switches the physical storage drives 107 connected to the storage controller 202.

The storage controller 202 includes one or more frontend packages (FEPK) 206, a maintenance interface (maintenance I/F) 208, one or more microprocessor packages (MPPK) 215, one or more cache memory packages (CMPK) 213, one or more backend packages (BEPK) 209, and an internal network 223.

The FEPK 206, the maintenance I/F 208, the MPPK 215, the CMPK 213, and the BEPK 209 are connected via the internal network 223. The BEPK 209 is connected to the drive enclosure 218 via a plurality of paths in the system.

The FEPK 206 is an example of an interface with the host 204 and includes one or more ports 207. The port 207 connects the storage controller 202 to various devices via the network 221 or the like, or connects the storage controller 202 to an external storage device 205.

The maintenance I/F 208 is an interface for connecting the storage controller 202 to the management server 203.

The MPPK 215 is a control unit, and includes one or more micro processors (MP) 216 and a local memory (LM) 217.

The MP 216 executes a program stored in the LM 217 to execute various kinds of processing. The MP 216 transmits various commands (for example, a READ command and a WRITE command in Small Computer System Interface (SCSI)) to the physical storage drives 107 in the drive enclosure 218 via the BEPK 209. The LM 217 stores various programs and various types of information.

The CMPK 213 includes one or more cache memories (CM) 214. The CM 214 temporarily stores data (write data) to be written from the host 204 to the physical storage drives 107 and data (read data) read from the physical storage drives 107.

The BEPK 209 is an example of an interface with the drive enclosure 218, and includes a parity calculator 210, a transfer buffer (DXBF) 211, and a backend controller (BE controller) 212.

The parity calculator 210 is, for example, a small processor, and, when a failure occurs in the drive enclosure 218, generates a redundant code (hereinafter, parity) for rebuilding a data element that cannot be read due to the failure. For example, for a data unit of a RAID group constituted by RAID 5, the parity calculator 210 generates P parity by taking an exclusive OR of a plurality of data elements constituting the data unit. Further, for a data unit of a RAID group constituted by RAID 6, the parity calculator 210 generates Q parity by multiplying a plurality of data elements constituting the data unit by a predetermined coefficient and then taking the exclusive OR of the respective data. The parity calculator 210 performs restoration processing for restoring any data element in the data unit based on one or more stripe data elements (data element and/or parity) for the data unit.

The transfer buffer 211 temporarily stores data transmitted from the drive enclosure 218 and data to be transmitted to the drive enclosure 218.

The BE controller 212 performs communication such as various commands, write data, and read data with the drive enclosure 218.

The storage controller 202 manages a capacity pool (hereinafter, simply referred to as a pool) constituted by storage regions of the plurality of physical storage drives 107. The storage controller 202 constitutes a RAID group by using the storage regions in the pool. That is, the storage controller 202 constitutes a plurality of virtual parity groups (VPG) by using the plurality of physical storage drives 107. The VPG is a virtual RAID group. Then, the storage controller 202 provides the host 204 with the virtual volume to which the storage regions in the VPG are allocated.

The storage region of the VPG includes a plurality of sub-storage region columns. Each of the sub-storage region columns includes a plurality of sub-storage regions. The plurality of sub-storage regions extend over the plurality of physical storage drives 107 constituting the VPG, and correspond to the plurality of physical storage drives 107, respectively. In the present specification, one sub-storage region is referred to as a "stripe", and the sub-storage region column is referred to as a "stripe column". A storage region of the RAID group is constituted by a plurality of stripe columns.

The RAID has several levels (hereinafter, referred to as "RAID levels"). For example, in the RAID 5, write target data designated by a host computer corresponding to the RAID 5 is divided into data of a predetermined size (hereinafter, referred to as "data unit" for convenience). Each data unit is divided into a plurality of data elements. The plurality of data elements are respectively written to a plurality of stripes in the same stripe column.

In the RAID 5, redundant information referred to as "parity" (hereinafter, "redundant code") is generated for each data unit in order to rebuild the data elements that cannot be read from the physical storage drive 107 due to that the physical storage drive 107 fails. The redundant code is also written to the stripe in the same stripe column as the plurality of data elements.

For example, when the number of physical storage drives 107 constituting the RAID group is four, three data elements each constituting a data unit are written in three stripes corresponding to three physical storage drives 107, and a redundant code is written in a stripe corresponding to the remaining one physical storage drive 107. Hereinafter, when the data element and the redundant code are not distinguished from each other, both may be referred to as stripe data elements.

In the RAID 6, two types of redundant codes (referred to as P parity and Q parity) are generated for each data unit, and each redundancy code is written in a stripe in the same stripe column. Accordingly, when two data elements among a plurality of data elements constituting the data unit cannot be read, the two data elements can be restored.

RAID levels other than those described above exist (for example, RAID 1 to 4). As a data redundancy technique, there is also a triple parity technique using a triple mirror (Triplication) and three parities. As for the technique of generating the redundant code, various techniques such as a Reed-Solomon code using Galois calculation and EVEN-ODD exist. In the following, the RAID 5 or RAID 6 will be mainly described, but the redundancy technique can be replaced with the above-described method.

When any one of the physical storage drives 107 fails, the storage controller 202 restores the data element stored in the failed physical storage drive 107.

The MP 216 in the MPPK 215 acquires the stripe data element (for example, other data element and parity) necessary for restoring the data element stored in the failed physical storage drive 107 from the plurality of physical storage drives 107 that store the data. The MP 216 stores the stripe data element acquired via an interface device (for example, BEPK 209) in the cache memory (CM) 214. The MP 216 then restores the data element based on the stripe data element of the cache memory 214 and stores the data element in a predetermined physical storage drive 107.

For example, for the data unit of the RAID group constituted by the RAIDs 5, the MP 216 generates the P parity by taking the exclusive OR (XOR) of a plurality of data elements constituting the data unit. Further, for a data unit of the RAID group constituted by the RAIDs 6, the MP 216 generates the Q parity by multiplying a plurality of data elements constituting the data unit by a predetermined coefficient and then taking the exclusive OR of the respective data.

The storage controller 202 provides a logical structure that applies a map creation method and mapping that converts the RAID width K into N drive spaces (K≤N). N is the number of physical storage drives 107 included in one distributed parity group 110. At this time, the storage controller 202 constitutes one virtual chunk 101 with K virtual parcels 103. Then, the storage controller 202 maps the virtual parcels 103 included in the same virtual chunk to different physical storage drives 107 among the N physical storage drives 107.

Further, it is assumed that only A (A is a positive integer) physical storage drives 107 are added. At this time, the storage controller 202 selects the virtual parcels 103 that are mapped to different physical storage drives 107 among the N physical storage drives 107 and are included in different virtual chunks 101, and changes the arrangement of the selected virtual parcels 103 to the added A physical storage drives 107. Then, the storage controller 202 constitutes a new chunk based on the unallocated virtual parcels 103 selected from the different physical storage drives 107 among the (N+A) physical storage drives 107. The new chunk (which may be referred to as a new Vchunk in the following description) is a new virtual chunk 101 constituted by the virtual parcels 103 that are not allocated to the physical parcels 109. In the following description, the virtual chunk 101 constituted by the virtual parcels 103 allocated to the physical parcels 109 may be referred to as an existing Vchunk.

Accordingly, the arrangement of the plurality of virtual parcels 103 that are included in the same virtual chunk and are mapped to the existing drives can be changed such that the virtual parcels 103 are not allocated to the same added drive, and unallocated regions of the virtual parcels 103 from the physical storage regions of different physical storage drives 107 can be secured without causing movement of the virtual parcels 103 between the existing drives.

Therefore, it is possible to constitute a new chunk in the distributed RAID while preventing the plurality of virtual parcels included in the same new chunk from being allocated to the same physical storage drive 107, and it is possible to expand capacity while reducing a data movement amount necessary for using the expanded capacity in the distributed RAID. In addition, the physical storage drive 107 can be added in units of one drive, and cost and time required for the expansion can be reduced as compared with the case of expanding in units of PG.

For example, it is assumed that the number of physical storage drives 107 is expanded from N to (N+1). At this time, the storage controller 202 selects (K−1) virtual parcels 103 that are mapped to different existing drives among the N existing drives, and are included in the different virtual chunks 101. Then, the storage controller 202 changes the arrangement of the selected virtual parcels 103 to one added physical storage drive 107. Then, the storage controller 202 constitutes a new chunk based on the (K−1) existing drives in which the arrangement of the virtual parcels 103 is changed and K unallocated virtual parcels respectively selected from the one added drive.

Accordingly, in order to constitute a new chunk in the distributed RAID, without causing the movement of the virtual parcels 103 between the existing drives, the number of the virtual parcels 103 moved from the existing drives can be minimized in order to allocate the K virtual parcels 103 included in the new chunk to the different physical storage drives 107.

Further, the storage controller 202 can sequentially increase the capacity available in the distributed RAID by repeating update of the mapping accompanying the adding of the one physical storage drive 107.

Hereinafter, a specific example of the storage system of FIG. 2 will be described in detail. In the following embodiments, an operation of the MP 216 may be described as an operation of the storage controller 202.

Figure 3:
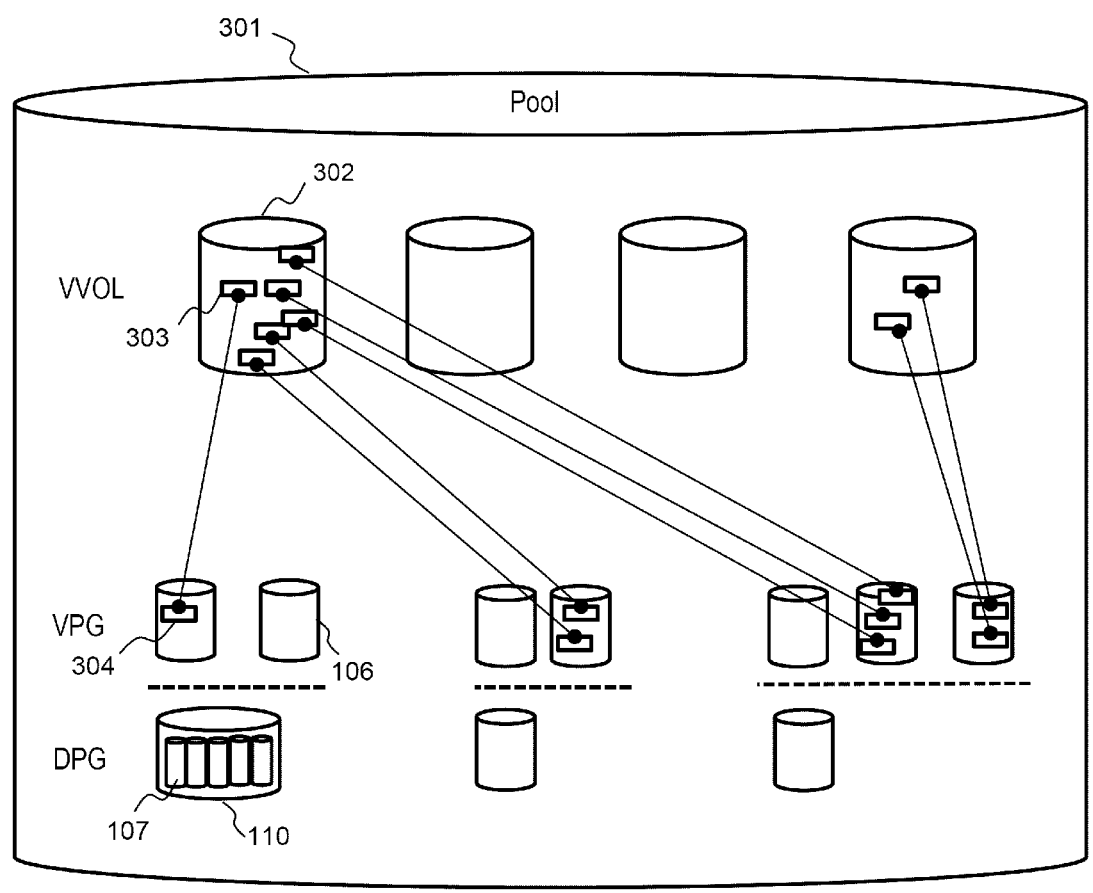
FIG. 3 is a block diagram showing a configuration example of a capacity pool managed by the storage system of FIG. 2.

FIG. 3 is a block diagram showing a configuration example of a capacity pool managed by the storage system of FIG. 2.

In FIG. 3, the storage controller 202 of FIG. 2 bundles a plurality of (for example, five) physical storage drives 107 to constitute the distributed parity group (DPG) 110. The storage controller 202 constitutes one or more distributed parity groups 110 and one or more virtual parity groups (VPG) 106 corresponding thereto. The storage controller 202 allocates a part of the storage region of the DPG 110 to the VPG 106.

In a pool 301, a plurality of virtual volumes (VVOL) 302 exist. In the example of FIG. 3, four VVOL 302 are shown. The VVOL 302 is a virtual storage device and can be referenced from the host 204. The management server 203 of FIG. 2 causes the storage controller 202 to create the VVOL 302 of any size via the maintenance I/F 208 according to an instruction from the administrator of the storage controller 202. The size does not depend on a total capacity of the physical storage drive 107. The storage controller 202 dynamically allocates a storage region in the VPG 106 (VPG page 304) to a storage region in the VVOL 302 (VVOL page 303) indicated by an I/O request (host I/O) from the host 204.

Figure 4:
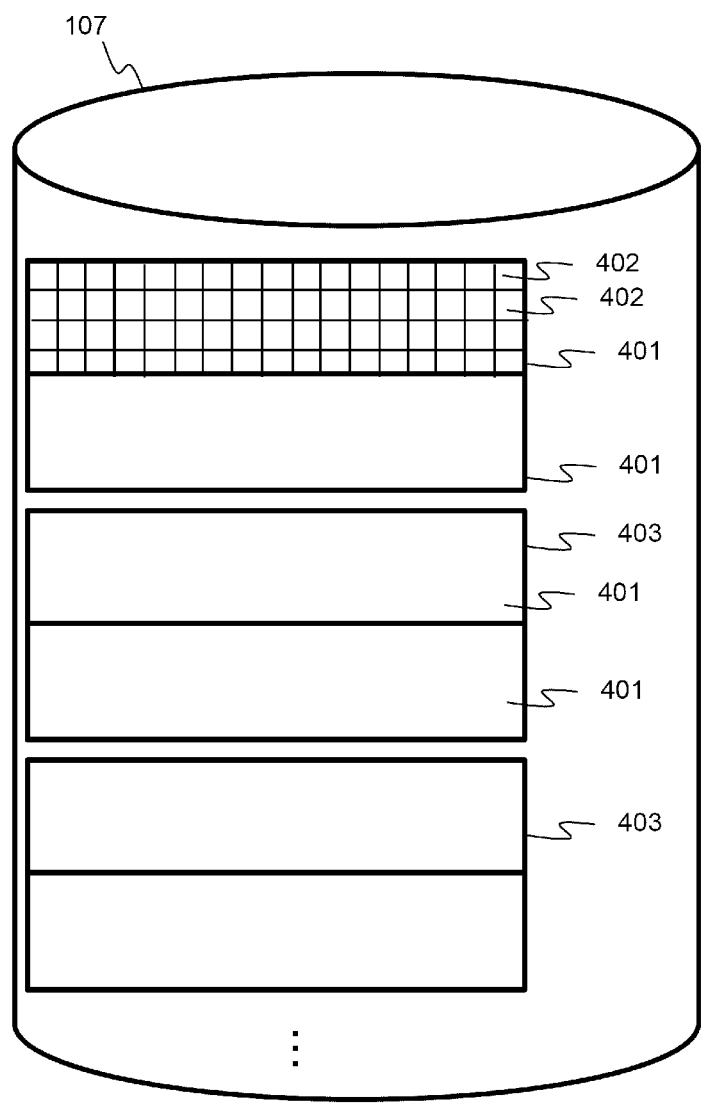
FIG. 4 is a block diagram showing an example of a data configuration of a physical storage drive used in the storage system of FIG. 2.

FIG. 4 is a block diagram showing an example of a data configuration of the physical storage drive used in the storage system of FIG. 2.

In FIG. 4, the physical storage drive 107 exchanges data with a higher-level device such as the storage controller 202 of FIG. 2 in units of a sub-block 402, which is a minimum unit (512 Bytes, for example) of SCSI command processing. A slot 401 is a management unit for caching data in the cache memory 214, and is, for example, 256 KB. The slot 401 is constituted by a set of a plurality of consecutive sub-blocks 402. A physical stripe 403 stores a plurality of (for example, two) slots 401.

Figure 5:
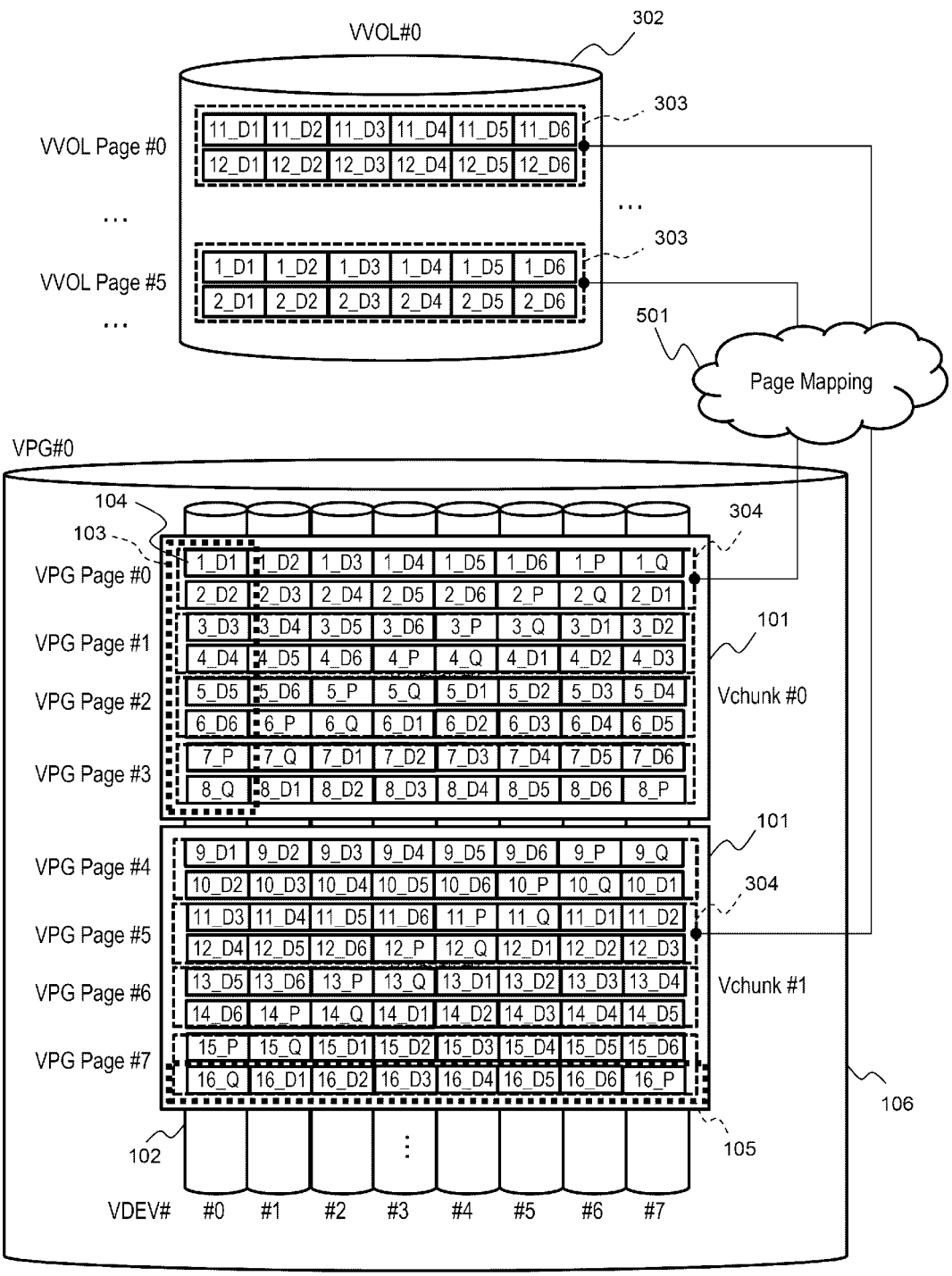
FIG. 5 is a block diagram showing an example of page mapping of a virtual volume managed by the storage system of FIG. 2.

FIG. 5 is a block diagram showing an example of page mapping of a virtual volume managed by the storage system of FIG. 2.

In FIG. 5, the VVOL 302 that can be recognized by the host 204 in FIG. 2 is constituted by a plurality of VVOL pages 303. The VVOL 302 has a unique identifier (VVOL number). In the example of FIG. 5, one VVOL 302 is shown, and VVOL #0 is given to the VVOL 302 as the VVOL number.

The storage controller 202 allocates the VPG pages 304 in the VPG 106 to the VVOL pages 303. Correspondence between the VVOL pages 303 and the VPG pages 304 is referred to as page mapping 501.

The page mapping 501 is dynamically managed by the storage controller 202. The plurality of VVOL pages having consecutive VVOL page # are given addresses of consecutive VVOL spaces.

The VPG 106 includes one or more virtual chunks (Vchunk) 101. The virtual chunk 101 includes a plurality of virtual parcels 103. In the example of FIG. 5, the virtual chunk 101 includes eight virtual parcels 103.

The virtual parcel 103 is constituted by consecutive regions in one virtual storage drive 102. The virtual parcel 103 is constituted by one or a plurality of virtual stripes 104. In the example of FIG. 5, the virtual parcel 103 is constituted by eight virtual stripes 104. The number of virtual stripes 104 in the virtual parcel 103 is not particularly limited. Since the virtual parcel 103 includes the plurality of virtual stripes 104, processing efficiency is implemented.

In the example of FIG. 5, the VPG 106 has a 6D+2P configuration of the RAID 6. That is, six data elements (D) constituting the data unit and two parities (P, Q) corresponding to the data elements are stored in different physical storage drives 107. In this case, the virtual chunk 101 is constituted by the virtual parcels 103 stored in, for example, eight different physical storage drives 107.

In other words, the virtual chunk 101 is constituted by a plurality of virtual stripe columns 105, and in the example of FIG. 5, the virtual chunk 101 is constituted by eight virtual stripe columns 105. When the virtual chunk 101 includes the plurality of virtual stripe columns 105, processing efficiency is implemented. The virtual chunk 101 may be constituted by one virtual stripe column 105.

The virtual chunk 101 includes a plurality of (for example, four) VPG pages 304. The VPG page 304 can store stripe data elements of a plurality of (for example, two) consecutive virtual stripe columns 105. For example, by setting the plurality of data units to several MB, sequential performance of the host I/O can be kept constant even when the physical storage drive 107 is a magnetic disk or the like.

In FIG. 5, those having common numbers in front of "_", such as 1_D1, 1_D2, 1_D3, 1_D4, 1_D5, 1_D6, 1_P, and 1_Q, indicate stripe data elements of the same virtual stripe column 105. The size of each stripe data element is the size of the physical stripe 403.

The VPG 106 has a unique identifier (VPG number) in a higher-level storage system. Further, a VDEV number (VDEV #) is given to each of the K (eight in the example of FIG. 5) virtual storage drives 102 in each VPG 106. The VDEV number is an identifier for addressing the storage region in the VPG 106, and is an identifier for representing correspondence with a drive (PDEV) in the DPG 110, which will be described below.

Each VVOL 302 is accessed from the host 204 using an identifier representing the VVOL 302 and an LBA. As shown in FIG. 5, the VVOL Page 303 is given VVOL Page # from the beginning of the VVOL 302. The VPG page 304 is given VPG Page # from the beginning of the VPG 106. VVOL Page # can be calculated by the following Formula (1) for the LBA designated by the host I/O. Here, Floor(x) is a function that returns a largest integer less than or equal to x for a real number x. Each of the LBA and the VVOLPagesize may be represented by the number of sub-blocks.

$$\text{VVOL Page \#=Floor(LBA/VVOLPagesize)} \quad (1)$$

Each of the VVOL page 303 and the VPG page 304 includes a plurality of virtual stripes. However, since the parity data is not accessed by the host 204, the parity cannot be seen on the VVOL 302. For example, in the case of 6D+2P shown in FIG. 5, the VPG page 304 including 8×2 virtual stripes in the space of VPG 106 appears as the VVOL page 303 including 6×2 virtual stripes in the space of the VVOL 302.

FIG. 5 shows an example in which one virtual chunk 101 is constituted by four pages, and one page is constituted by two virtual stripe columns 105. In addition, FIG. 5 shows an example in which, by the page mapping 501, the VPG page 304 of VPG Page #0 is mapped to the VVOL page 303 of VVOL Page #5, and the VPG page 304 of VPG Page #5 is mapped to the VVOL page 303 of VVOL Page #0.

By correcting the space of the VPG 106 and the space of the VVOL 302, the storage controller 202 can calculate the VDEV #, Vchunk # in the VPG # corresponding to the LBA on the VVOL 302 side and an offset address in the virtual parcel 103 in combination with the page mapping 501. Of course, the storage controller 202 can also calculate the VDEV #, Vchunk # in the VPG # of the parity region corresponding to the host I/O, and the offset address in the virtual parcel 103.

Although FIG. 5 shows an example using the RAID 6 (6D+2P), the number of Ds may be increased, such as 14D+2P, or RAID 5 or RAID 1 may be used. In addition, a virtual parcel of only parity may be created as in RAID 4. In the case of normal RAID4, a logical design of an upper layer can be simplified. However, since access concentrates on the parity drive at the time of writing, the parity drive tends to become a bottleneck. However, in the case of the distributed RAID configuration, the data in the parity drive on the VPG 106 is distributed to the plurality of physical storage drives 107 on the DPG 110, so that the effect of the bottleneck of the parity drive can be reduced. In addition to the Galois calculation, other methods such as the EVEN-ODD method may be used for encoding the Q parity in the RAID 6.

Figure 6:
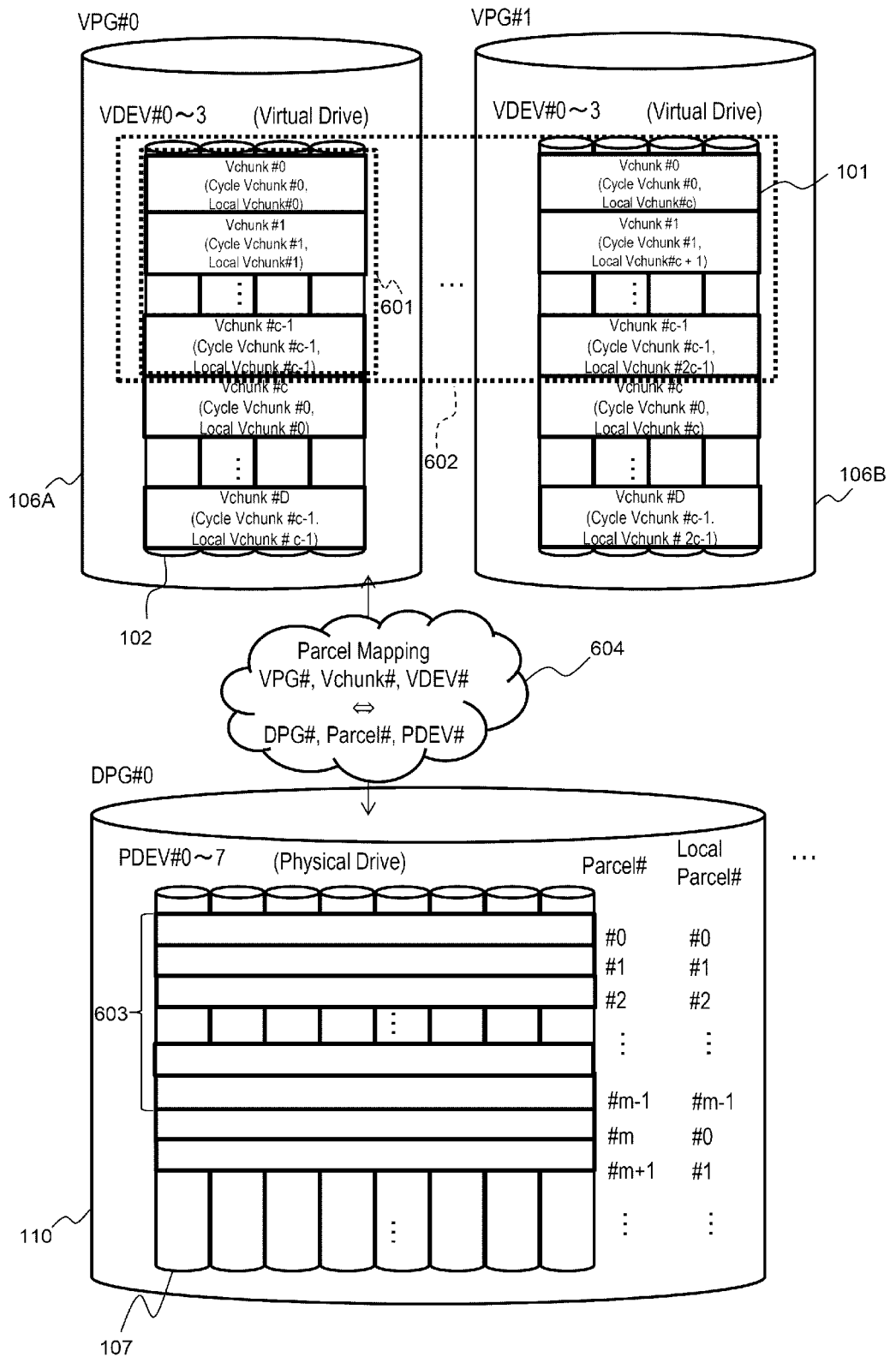
FIG. 6 is a block diagram showing an example of a parcel mapping between a virtual parity group and a distributed parity group managed by the storage system of FIG. 2.

FIG. 6 is a block diagram showing an example of a parcel mapping between a virtual parity group and a distributed parity group managed by the storage system of FIG. 2.

In FIG. 6, the virtual chunks 101 are consecutive in the space of the storage region of the VPG 106. The consecutive c (c is a positive integer) virtual chunks 101 constitute a Vchunk period 601. In N physical storage drives 107 that constitute the DPG 110, a total of N×m physical parcels 109 formed of m (m is a positive integer) physical parcels 109 that are consecutive in respective physical storage drives 107 constitute a Parcel cycle 603. c is referred to as the number of period Vchunks. m is referred to as the number of period Parcels. A set of Vchunk periods 601 having a common Vchunk period # for E VPGs (E is a positive integer) constituted by the common DPG 110 is referred to as a Vchunk period group 602. The Vchunk period # is an identifier for identifying c virtual chunks 101 in the VPG 106 for each of the Vchunk periods 601.

One Vchunk period group 602 corresponds to one Parcel cycle 603. Also, parcel mapping 604 is periodic. That is, the parcel mapping 604 is common to each pair of the Vchunk period group 602 and the Parcel cycle 603. Since the parcel mapping 604 between the virtual storage region and the physical storage region is periodic, data can be appropriately distributed to a plurality of physical storage regions, and efficient management of the parcel mapping 604 is implemented. Non-periodic, that is, parcel mapping of only one period may be adopted.

The identifier of the virtual chunk 101 in each Vchunk period 601 is represented by Cycle Vchunk # (CVC #). Therefore, CVC # takes values from 0 to c−1. The identifier of the physical parcel 109 in the Parcel cycle 603 is represented by Local Parcel # (LPC #). The LPC # takes values from 0 to m−1. A plurality of physical parcels 109 are allocated to data entities of the plurality of virtual parcel 103 in each virtual chunk 101.

The identifier of the virtual chunk 101 (Local Vchunk) in the Vchunk period group 602 is represented by Local Vchunk # (LVC #). LVC # is uniquely obtained from VPG #n and CVC #. LVC #=n×c+CVC # is obtained.

Figure 7:
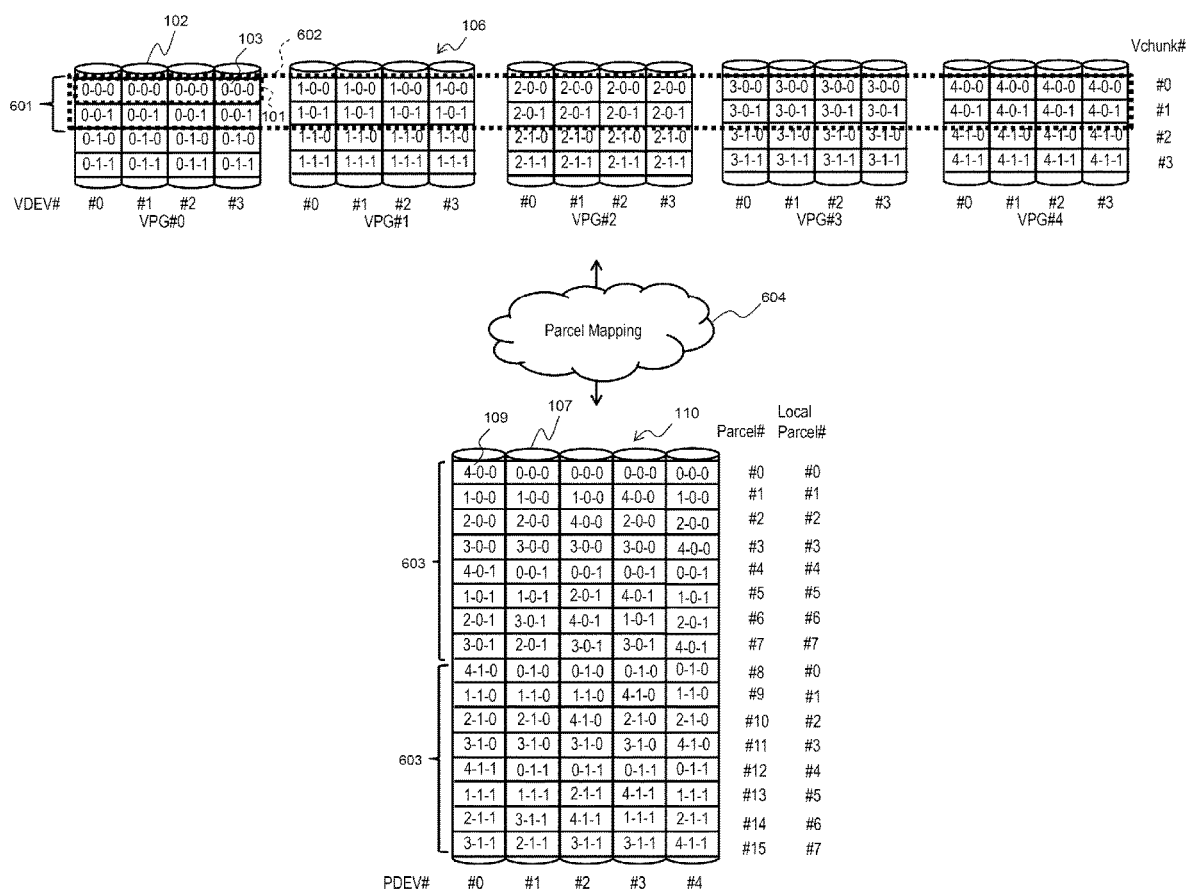
FIG. 7 is a block diagram showing another example of a parcel mapping between the virtual storage region and the physical storage region managed by the storage system of FIG. 2.

FIG. 7 is a block diagram showing another example of the parcel mapping between the virtual storage region and the physical storage region managed by the storage system of FIG. 2.

FIG. 7 shows an example of the parcel mapping 604 of the VPG 106 and the DPG 110 wherein c=2, m=8, K=4, and N=5. c is the number of Vchunks in the Vchunk period 601, m is the number of in-drive Parcels in the Parcel cycle 603, K is the number of drives in the VPG 106, and N is the number of drives in the DPG 110.

In a Vchunk identifier "x-y-z" written in the virtual parcel 103 in the virtual storage drive 102 in the VPG 106, x represents VPG #, y represents Vchunk period #, and z represents CVC #. At this time, the Vchunk # can be obtained from the Vchunk period # and CVC #. The same Vchunk identifier is written in the physical parcels 109 allocated to the virtual parcel 103 in the virtual storage drive 102. In the parcel mapping 604, correspondence between the plurality of virtual parcels 103 in one Vchunk period 601 and the plurality of physical parcels 109 in one Parcel cycle 603 is referred to as a mapping pattern. For example, the mapping pattern is represented using the Vchunk identifier and VDEV # corresponding to each physical parcel 109 in one Parcel cycle 603. The mapping pattern of each Parcel cycle 603 is common.

In the example of FIG. 7, two Vchunk periods 601 and two Parcel cycles 603 are shown. Each Parcel cycle 603 spans five physical storage drives 107. All physical parcels 109 of one Parcel cycle 603 are allocated to the virtual parcels 103 in one Vchunk period group 602.

In this way, by repeatedly arranging the parcel mapping 604 for each combination of the Vchunk period 601 and the Parcel cycle 603, a scale of the mapping pattern can be reduced, and a load of generating the mapping pattern and a load of address conversion can be reduced.

Although m=8 here, in any case where the number of physical storage drives 107 is not an integer multiple of K, m may be an integer multiple of K in order to appropriately set the mapping between VPG and DPG.

Figure 8:
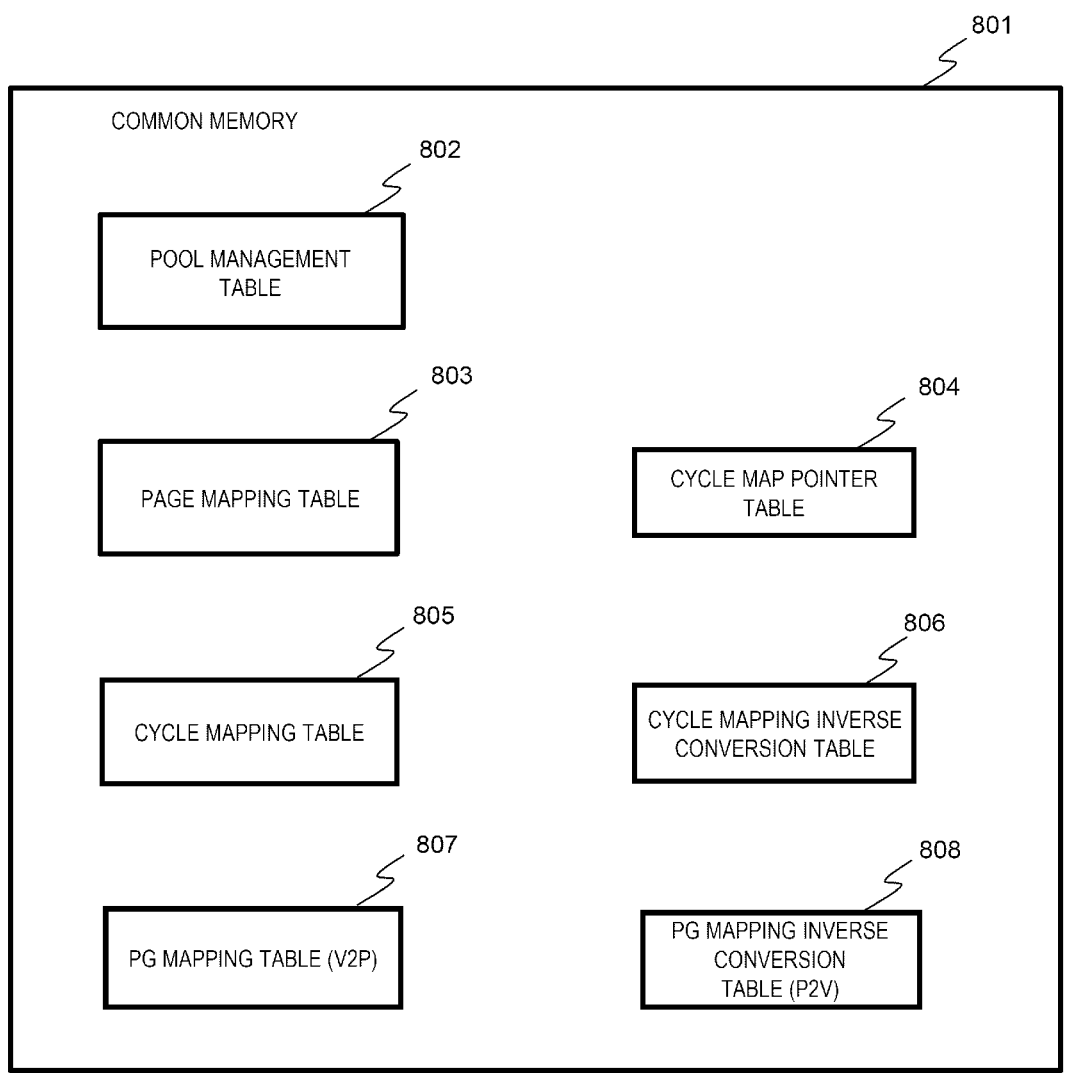
FIG. 8 is a block diagram showing contents of a common memory managed by the storage system of FIG. 2.

FIG. 8 is a block diagram showing contents of a common memory managed by the storage system of FIG. 2.

In FIG. 8, a common memory 801 is constituted using, for example, at least one storage region of the physical storage drive 107, CM 214, and LM 217 of FIG. 2. The storage controller 202 may constitute the logical common memory 801 using a plurality of storage regions in the physical storage drive 107, CM 214, and LM 217, and may perform cache management for various types of information.

The common memory 801 stores a pool management table 802, a page mapping table 803, a cycle map pointer table 804, a cycle mapping table 805, a cycle mapping inverse conversion table 806, a PG mapping table (V2P) 807, and a PG mapping inverse conversion table (P2V) 808.

In the parcel mapping, the mapping pattern is represented by the PG mapping table 807, the cycle map pointer table 804, and the cycle mapping table 805.

In addition, when a drive is added, a mapping pattern before the adding is referred to as a current mapping pattern (Current), a mapping pattern during the adding is referred to as a midway mapping pattern (Changing), and a mapping pattern after the adding is referred to as a target mapping pattern (Target). That is, when a single drive is added, the common memory 801 stores the cycle mapping table 805 and the cycle mapping inverse conversion table 806 of the Current, the cycle mapping table 805 and the cycle mapping inverse conversion table 806 of the Changing, and the cycle mapping table 805 and the cycle mapping inverse conversion table 806 of the Target. The PG mapping table 807 and the cycle map pointer table 804 may store a common table before and after the adding, and the configuration is not limited thereto.

Figure 9:
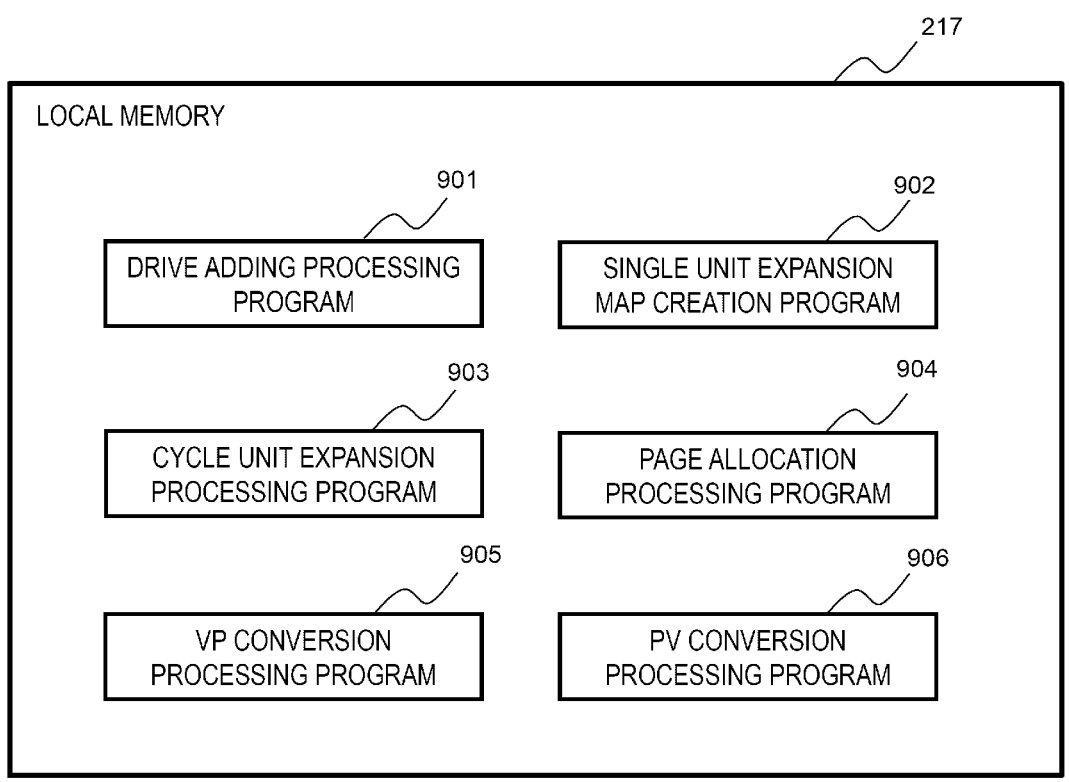
FIG. 9 is a block diagram showing contents of a local memory of FIG. 2.

FIG. 9 is a block diagram showing contents of a local memory of FIG. 2.

In FIG. 9, the local memory 217 stores a drive adding processing program 901, a single unit expansion map creation program 902, a cycle unit expansion processing program 903, a page allocation processing program 904, a VP conversion processing program 905, and a PV conversion processing program 906. Specific processing of each program will be described below.

FIG. 10 is a diagram showing an example of the pool management table of FIG. 8.

In FIG. 10, the pool management table 802 is information indicating correspondence between the pool 301 and the VPG 106 in FIG. 3. The pool management table 802 includes fields of Pool # 1001, VPG # 1002, the number of allocatable Vchunks 1003, and the number of allocatable VPG pages 1004.

The storage controller 202 can check an identifier of the VPG 106 belonging to the pool 301 specified by the Pool # 1001, the number of allocatable Vchunks 1003 of each VPG 106, and the number of allocatable VPG pages 1004 of each VPG 106 by the pool management table 802.

The number of allocatable Vchunks 1003 stores a value of 0 or more based on a capacity of the corresponding DPG 110. In the VPG 106 indicated by the VPG # 1002, the page cannot be allocated to the Vchunk # that exceeds the number of allocatable Vchunks 1003. When the number of period Parcels is m and the number of the Parcel cycles in the DPG 110 is W, a maximum value of the number of allocatable Vchunks 1003 V is set by the following Formula (2).

$$\text{Maximum value of the number of allocatable Vchunks } V = W \times m/K \qquad (2)$$

Here, since m is an integer multiple of K, a result of the Formula (2) is always an integer.

When the physical parcel 109 is separately reserved as a spare region in the Parcel cycle, m does not have to be a multiple of K. With the number of reserve parcels in the Parcel cycle being s, m−s may be a multiple of K. In this case, the maximum value of the number of allocatable Vchunks 1003 is set by the following Formula (3).

$$\text{Maximum value of the number of allocatable Vchunks } V = W \times (m-s)/K \qquad (3)$$

The number of allocatable VPG pages 1004 stores a value of 0 or more based on the capacity of the corresponding DPG 110. In the VPG 106 indicated by the VPG # 1002, the page cannot be allocated to the Vchunk # that exceeds the number of allocatable VPG pages 1004. The number of allocatable VPG pages P is set by the following Formula (4) with the number of allocatable Vchunks being V_c and the number of VPG pages in the Vchunk being VP.

$$\text{The number of allocatable VPG pages } P = V\_c \times VP \qquad (4)$$

As is apparent from Formula (4) described above, the number of allocatable VPG pages is proportional to the number of allocatable Vchunks 1003. In the following description, when simply mentioning update and delete of the allocatable Vchunk number 1003, unless otherwise specified, the number of allocatable VPG pages 1004 is also be updated. The number of allocatable VPG pages 1004 at the time of updating is calculated by the above Formula (4).

Figure 11:
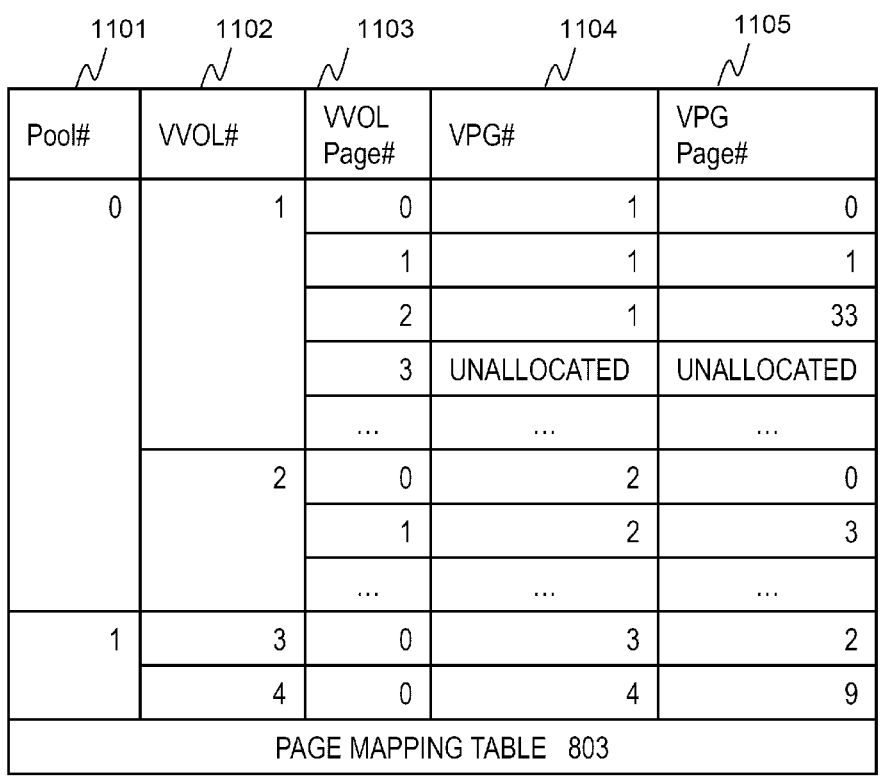
FIG. 11 is a diagram showing an example of a page mapping table of FIG. 8.

FIG. 11 is a diagram showing an example of the page mapping table of FIG. 8.

In FIG. 11, the page mapping table 803 is information indicating correspondence between the page 303 of the VVOL 302 and the page 304 of the VPG 106 of FIG. 3. The page mapping table 803 includes fields of Pool # 1101, VVOL # 1102, VVOL page # 1103, VPG # 1104, and VPG page # 1105. The Pool # 1101, the VVOL # 1102, and the VVOL page # 1103 indicate the VVOL page 303. The VPG # 1104 and the VPG Page # 1105 indicate the VPG page 304 allocated to the VVOL page 303. A value corresponding to "unallocated" is stored in the VPG # 1104 and VPG page # 1105 corresponding to an unused VVOL page # 1103.

Figure 12:
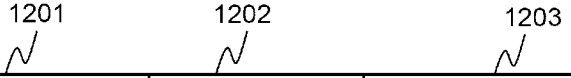
FIG. 12 is a diagram showing an example of a map pointer table of FIG. 8.

FIG. 12 is a diagram showing an example of the map pointer table of FIG. 8.

In FIG. 12, the map pointer table 804 includes fields of DPG # 1201, cycle # 1202, and cycle map version 1203. The storage controller 202 can refer to a version of the cycle mapping table 805 that needs to be referred at the time of address conversion by using the map pointer table 804. The cycle map version 1203 is updated when the drive is added. A cycle of the cycle map version 1203 of "Target" indicates that the adding processing is completed.

When an address in a DPG space is accessed during the adding processing, the storage controller 202 performs address conversion using the cycle mapping table 805 after the adding when the cycle map version 1203 corresponding to the cycle of the designated DPG space is "Target", performs the address conversion using the cycle mapping table 805 before the adding when the cycle map version is "Current", and performs the address conversion using the cycle mapping table 805 during the adding when the cycle map version is "Changing".

Figure 13:
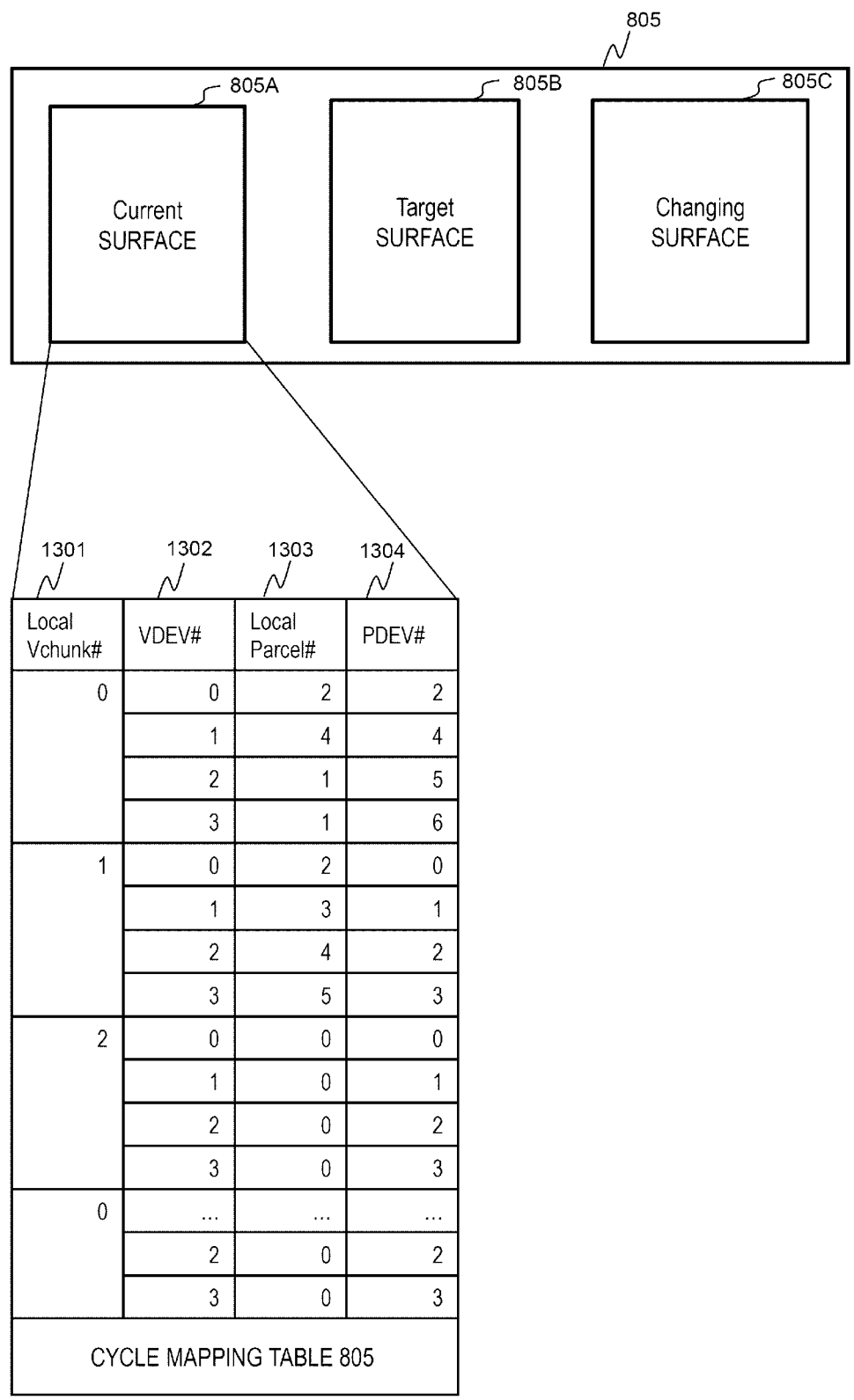
FIG. 13 is a diagram showing an example of a cycle mapping table of FIG. 8.

FIG. 13 is a diagram showing an example of the cycle mapping table of FIG. 8.

In FIG. 13, the cycle mapping table 805 has three types of tables: a Current surface 805A, a Target surface 805B, and a Changing surface 805C. These tables exist for referring to a correct address in the middle of the adding processing of a drive to be described below.

The Current surface 805A represents the current mapping table 805, the Target surface 805B represents the target mapping table 805 after adding and removing, and the Changing surface 805C represents the mapping table 805 during the transition of adding and removing. Each cycle mapping table 805 includes fields of Local Vchunk # 1301, VDEV # 1302, Local Parcel # 1303, and PDEV # 1304.

By referring to the mapping table 805, the storage controller 202 can acquire the Local Parcel # 1303 and the PDEV # 1304 using the Local Vchunk # 1301 and the VDEV # 1302 as keys.

Figure 14:
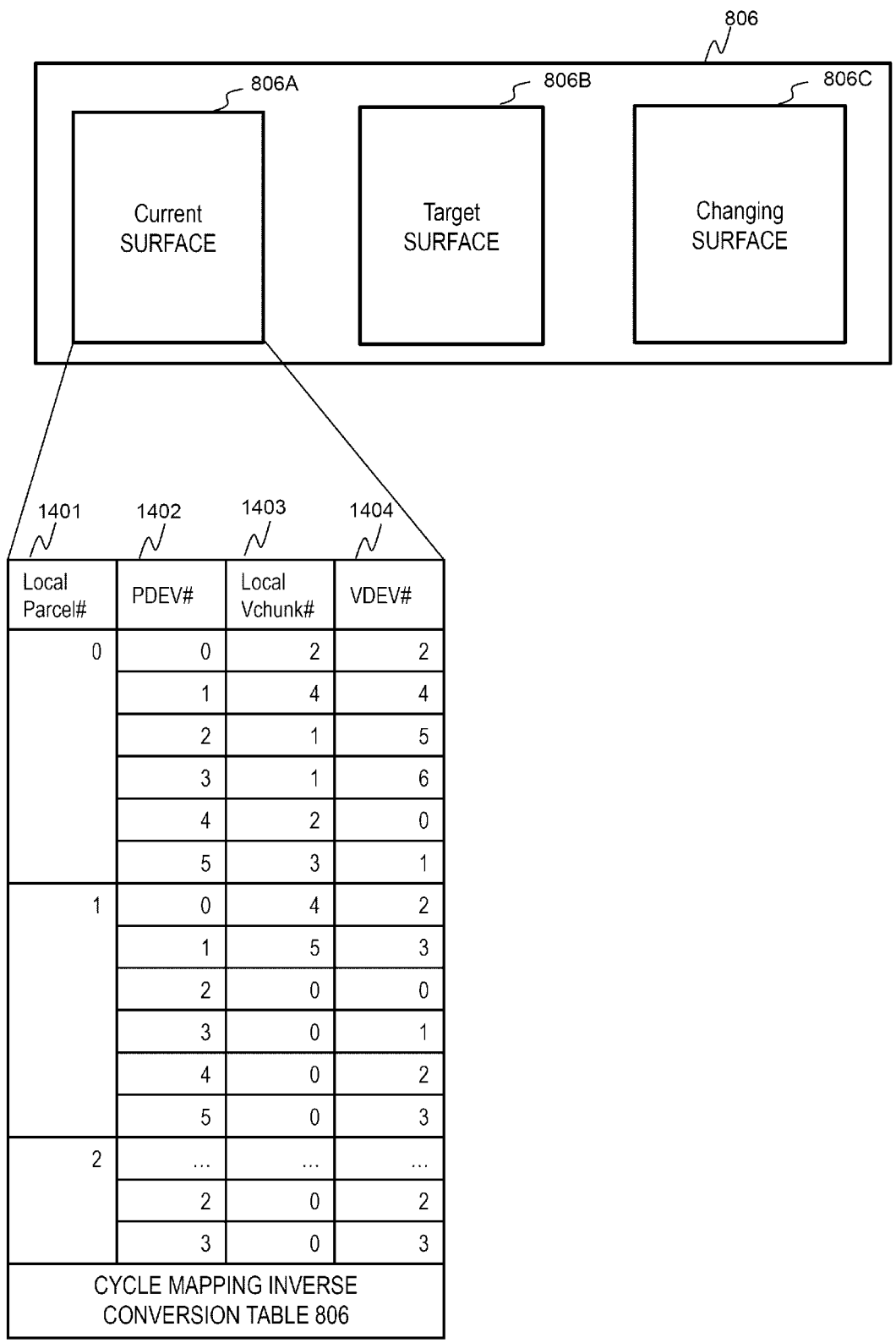
FIG. 14 is a diagram showing an example of a cycle mapping inverse conversion table of FIG. 8.

FIG. 14 is a diagram showing an example of the cycle mapping inverse conversion table of FIG. 8.

In FIG. 14, the cycle mapping inverse conversion table 806 is an inverse lookup table of the cycle mapping table 805, and has three types of tables: a Current surface 806A, a Target surface 806B, and a Changing surface 806C, similarly to the cycle mapping table 805.

The Current surface 806A of the cycle mapping inverse conversion table 806 is an inverse lookup table of the Current surface 805A of the cycle mapping table 805, the Target surface 806B of the cycle mapping inverse conversion table 806 is an inverse lookup table of the Target surface 805B of the cycle mapping table 805, and the Changing surface 806C of the cycle mapping inverse conversion table 806 is an inverse lookup table of the Changing surface 805C of the cycle mapping table 805. Each cycle mapping inverse conversion table 806 includes fields of Local Parcel # 1401, PDEV # 1402, Local Vchunk # 1403, and VDEV # 1404.

The storage controller 202 can acquire the Local Vchunk # 1403 and VDEV # 1404 by using the Local Parcel # 1401 and PDEV # 1402 as keys by referring to the cycle mapping inverse conversion table 806. The cycle mapping inverse conversion table 806 is updated in conjunction with the cycle mapping table 805.

In the following description, when the cycle mapping table 805 is created, updated and deleted or the Current surface, the Target surface and the Changing surface are set, unless otherwise specified, the cycle mapping inverse conversion table 806 is also created, updated and deleted or the Current surface, the Target surface and the Changing surface are set according to the cycle mapping table 805.

FIG. 15A is a diagram showing an example of the PG mapping table of FIG. 8.

In FIG. 15A, the PG mapping (V2P) table 807 is a table for managing the mapping between the VPG 106 and the DPG 110 in FIG. 3. The PG mapping (V2P) table 807 includes a virtual parity group number (VPG #) 1501 and a distributed parity group number (DPG #) 1502.

In the PG mapping (V2P) table 807, a value of the distributed parity group number (DPG #) 1502 can be obtained from the virtual parity group number (VPG #) 1501.

Figure 15B:
FIG. 15B is a diagram showing an example of a PG mapping inverse conversion table of FIG. 8.

FIG. 15B is a diagram showing an example of the PG mapping inverse conversion table of FIG. 8.

In FIG. 15B, the PG mapping (P2V) inverse conversion table 808 is an inverse lookup table of the PG mapping (V2P) table 807. The PG mapping (P2V) inverse conversion table 808 includes a distributed parity group number (DPG #) 1504 and a virtual parity group number (VPG #) 1503.

In the PG mapping (P2V) inverse conversion table 808, a value of the virtual parity group number (VPG #) 1503 can be obtained from the distributed parity group number (DPG #) 1504.

The mapping at the time of adding the physical storage drive 107 will be specifically described below. When mapping, the storage controller 202 of FIG. 2 reduces a data movement amount necessary for using the expanded capacity by, for example, creating a map that reduces the movement amount of the existing data in order to secure a data region necessary for data redundancy when the drives are added from N to N+1. By defining an address space with the drive capacity of one drive, which is an expansion unit, and providing the address space to the user, the capacity can be expanded in units of any drives. At this time, since the expansion can be implemented in unit of one drive and data movement between existing drives during the expansion can be eliminated, so that it is possible to reduce the data movement amount before the capacity is available, as compared with the case of expanding in units of PG.

FIG. 16 is a block diagram showing an example of a parcel mapping method when one physical storage drive used in the storage system of FIG. 2 is added.

FIG. 16 shows an example in which one drive is added and the number of drives is changed to N=5 from a state in which the number of drives is N=4 in the configuration where the number of in-drive Parcels in the Parcel cycle 603 is m=4 and the number of drives in the DPG 110 is N=4.

P1 indicates a current mapping pattern which is an initial mapping pattern before the drive adding. At this time, the storage controller 202 allocates four virtual parcels 103 included in the same virtual chunk 101 to different physical storage drives 107 among the four physical storage drives 107, respectively. For example, the four virtual parcels 103 each having the Vchunk identifier "0-0" are included in the same virtual chunk 101, and are allocated to the physical storage drives 107 having different PDEV #s, respectively. In the example of FIG. 16, only two Parcel cycles 603 are described for the sake of simplicity.

In the Vchunk identifier "x-y" written in the physical parcel 109 in the physical storage drive 107 in the DPG 110, x represents the LVC # of the corresponding virtual parcel 103, and y represents the Vchunk period #. Here, the virtual parcels mapped to the physical parcels 109 in which the same Vchunk identifier is written belong to the same virtual chunk. For example, the four virtual parcels that are respectively mapped to the four physical parcels 109 each having the Vchunk identifier "0-0" written belong to the same virtual chunk.

In this state, the storage controller 202 cannot store the data since the data redundancy cannot be performed only in the storage region of the one added physical storage drive 1601.

P2 indicates a mapping pattern during the drive adding. The storage controller 202 allocates a part of the physical parcels 109 to which the virtual parcels 103 constituting the existing virtual chunk 101 are mapped to the one added physical storage drive 1601. Accordingly, in the existing physical storage drives 107, the physical parcels 109 to which the virtual parcels 103 constituting the existing virtual chunk 101 are not mapped can be created.

Here, when a free region that is not mapped to the virtual parcels 103 constituting the existing virtual chunk 101 is generated in the existing physical storage drives 107, since it is not necessary to move data within the existing physical storage drives 107 and between the existing physical storage drives 107, the data movement amount necessary for using the expanded capacity can be reduced.

The storage controller 202 selects the virtual parcels 103 included in the different virtual chunks 101 mapped to the different existing physical storage drives 107 in each Parcel cycle 603, and changes the arrangement of the selected virtual parcels 103 to the one added physical storage drive 1601. Accordingly, it is possible to change the arrangement of the virtual parcels 103 such that the plurality of virtual parcels 103 included in the same virtual chunk mapped to the existing drives 107 are not allocated to the same added drive 1601, it is possible to secure an unallocated region of the virtual parcels 103 from the physical storage region of different existing drives 107 and added drive 1601, and it is possible to prevent a plurality of virtual parcels included in the same new chunk from being allocated to the same existing drives 107 or the added drive 1601.

In the example of FIG. 16, for each Parcel cycle 603, the physical parcels 109 to be moved by 1 Parcel are selected from three of the four existing drives 107, and a total of three physical parcels 109 are moved to the added drive 1601, and the movement amount depends on the number of period Parcels, the number of reserved parcels in the period Parcels, and the number of Parcels constituting the virtual chunk 101. A movement amount T for each Parcel cycle is expressed by the following Formula (5) with the number of period Parcels being m, the number of reserved parcels in the period Parcels being s, and the number of VPG drives being K.

$$T=(K-1)\times(m-s)/K \quad (5)$$

At P3, a new VChunk is created. The new Vchunk is constituted by parcels that are not mapped to the virtual chunk 101 generated by the above-described existing Vchunk reconstruction processing.

At this time, by moving a total of three physical parcels 109 from three of the four existing drives 107 to the added drive 1601 for each Parcel cycle 603, three physical parcels 109 in the existing drives 107 to which the virtual parcels are not mapped are created, and one physical parcel 109 in the added drive 1601 to which the virtual parcel is not mapped is created. Therefore, it is possible to constitute the new Vchunk including four virtual parcels 103 for each Parcel cycle 603. FIG. 16 shows an example in which one new chunk is constituted by four virtual parcels 103 each having a Vchunk identifier "4-0" and one new chunk is constituted by four virtual parcels 103 each having a Vchunk identifier of "4-1" in each Parcel cycle 603.

The number of the new Vchunks for each Parcel cycle depends on the number of period Parcels, the number of reserved parcels in the period Parcels, and the number of Parcels constituting the Vchunk. The number of new Vchunks V is expressed by the following Formula (6) with the number of period Parcels being m, the number of reserved parcels in the period Parcels being s, and the number of VPG drives being K.

$$V=(m-s)/K \quad (6)$$

A capacity of the new Vchunk (=V×K) is equal to a capacity (=m−s) of the added drive 1601 excluding the spare.

After that, the storage controller 202 performs parcel movement processing for moving data according to the mapping pattern, and ends the adding processing. After the parcel movement processing is completed, the storage controller 202 permits all VPG pages in the new VChunk to be allocated to VVOL pages.

In the data movement shown in the present embodiment, as shown by P2 and P3, in order to use the capacity m−s excluding the capacity reserved as a spare among the capacity for each Parcel cycle of the add drive, data movement of T(=(K−1)×(m−s)/K) is necessary. In other words, (K−1)/K of the expanded drive capacity can be used due to the data movement.

Although FIG. 16 shows an example of a mapping pattern creation method when one drive is added, when a plurality of drives are added together, for example, when X drives are added at the same time, it is possible to create the mapping pattern after the X drives are added by assuming that one drive is repeatedly added X times and repeating the mapping pattern creation processing after the one drive is added X times.

Figure 17:
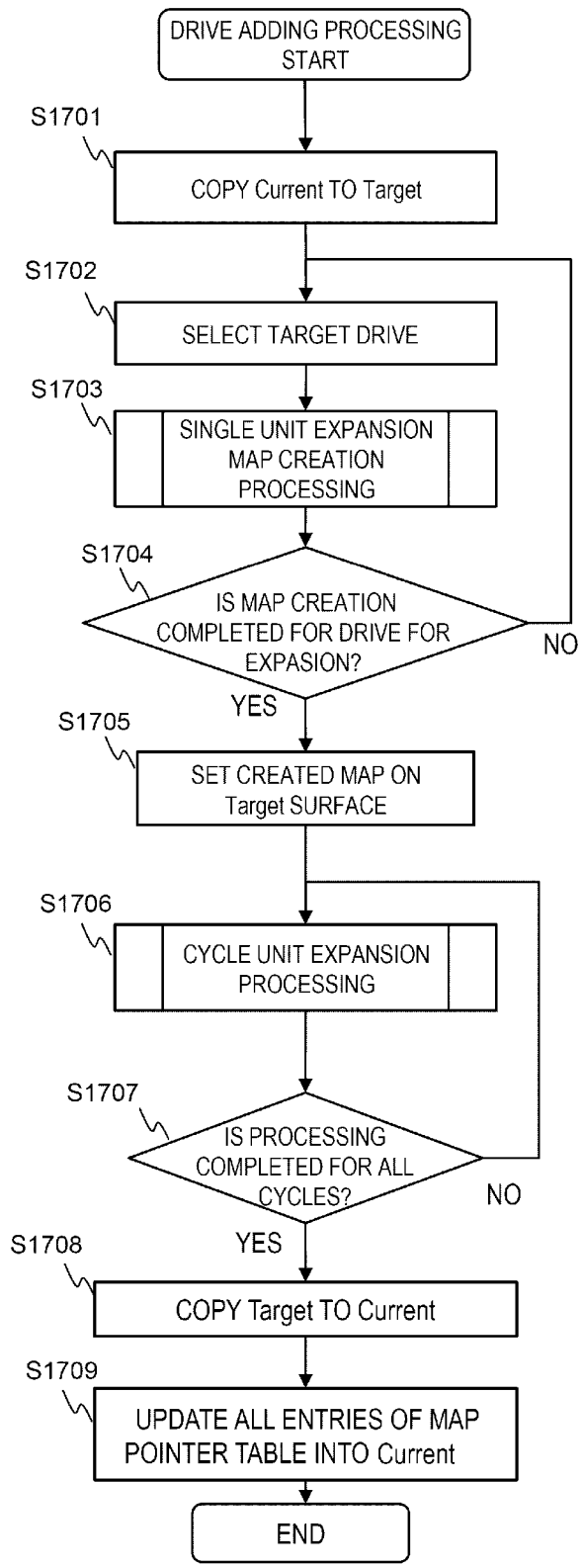
FIG. 17 is a flowchart showing an example of drive adding processing executed in the storage system of FIG. 2.

FIG. 17 is a flowchart showing an example of the drive adding processing executed in the storage system of FIG. 2.

In FIG. 17, the drive adding processing program 901 shown in FIG. 9 performs adding processing when a drive is added. The administrator adds a drive for expansion to the storage system (hereinafter, also simply referred to as a system) and then inputs an expansion instruction in drive units for the DPG to the management server 203 in FIG. 2. The storage controller 202 executes the drive adding processing upon receiving the expansion instruction from the management server 203. Alternatively, the management server 203 or the storage controller 202 may automatically execute the drive adding processing upon detection of addition of the drive for expansion to the system.

First, the drive adding processing program 901 copies contents of the Current surface 805A of the cycle mapping table 805 of FIG. 13 to the cycle mapping table 805 on the Target surface 805B (step S1701).

Next, the drive adding processing program 901 selects any one of the drives for expansion as a target drive (step S1702). For example, the drive adding processing program 901 may select the target drive from the drives for which the drive adding processing is not performed among the drives for expansion in an ascending order of the physical drive # in the system.

Next, the drive adding processing program 901 performs single unit expansion map creation processing (step S1703). The single unit expansion map creation processing will be described below.

Next, the drive adding processing program 901 determines whether the single unit expansion map creation processing is completed for all the drives for expansion added to the system (step S1704). When the single unit expansion map creation processing is not completed for all the drives for expansion (NO in step S1704), the drive adding processing program 901 returns to step S1702 and performs the same processing for a next target drive. When the single unit expansion map creation processing is completed for all the drives for expansion (YES in step S1704), the created mapping pattern after the expansion is set on the Target surface 805B of the cycle mapping table 805 (step S1705).

Next, the drive adding processing program 901 performs cycle unit expansion processing (step S1706). The cycle unit expansion processing will be described below.

Next, the drive adding processing program 901 determines whether the cycle unit expansion processing is completed for all cycles (step S1707). For example, the map pointer table 804 may be referred to for the determination. If all of the cycle map versions 1203 corresponding to the DPG # to be expanded are in a state of referring to Target, it can be considered that the cycle unit expansion processing is completed.

When the cycle unit expansion processing is not completed for all the cycles (NO in step S1707), the drive adding processing program 901 returns to step S1706 and performs the same processing for a next target drive. When the cycle unit expansion processing is completed for all the cycles (YES in step S1707), the cycle mapping table 805 of the Current surface 805A is updated to the cycle mapping table of the Target surface 805B (step S1708). Accordingly, the Current surface 805A and the Target surface 805B matches in contents of the mapping pattern after the expansion.

Next, the drive adding processing program 901 refers to the map pointer table 804, updates all of the cycle map versions 1203 corresponding to the DPG # to be expanded to Current, and ends the processing (step S1709). Accordingly, when a next new drive is added, it is possible to continuously refer to the current mapping pattern even when the above-described processing is performed again to update the Target surface 805B.

Figure 18:
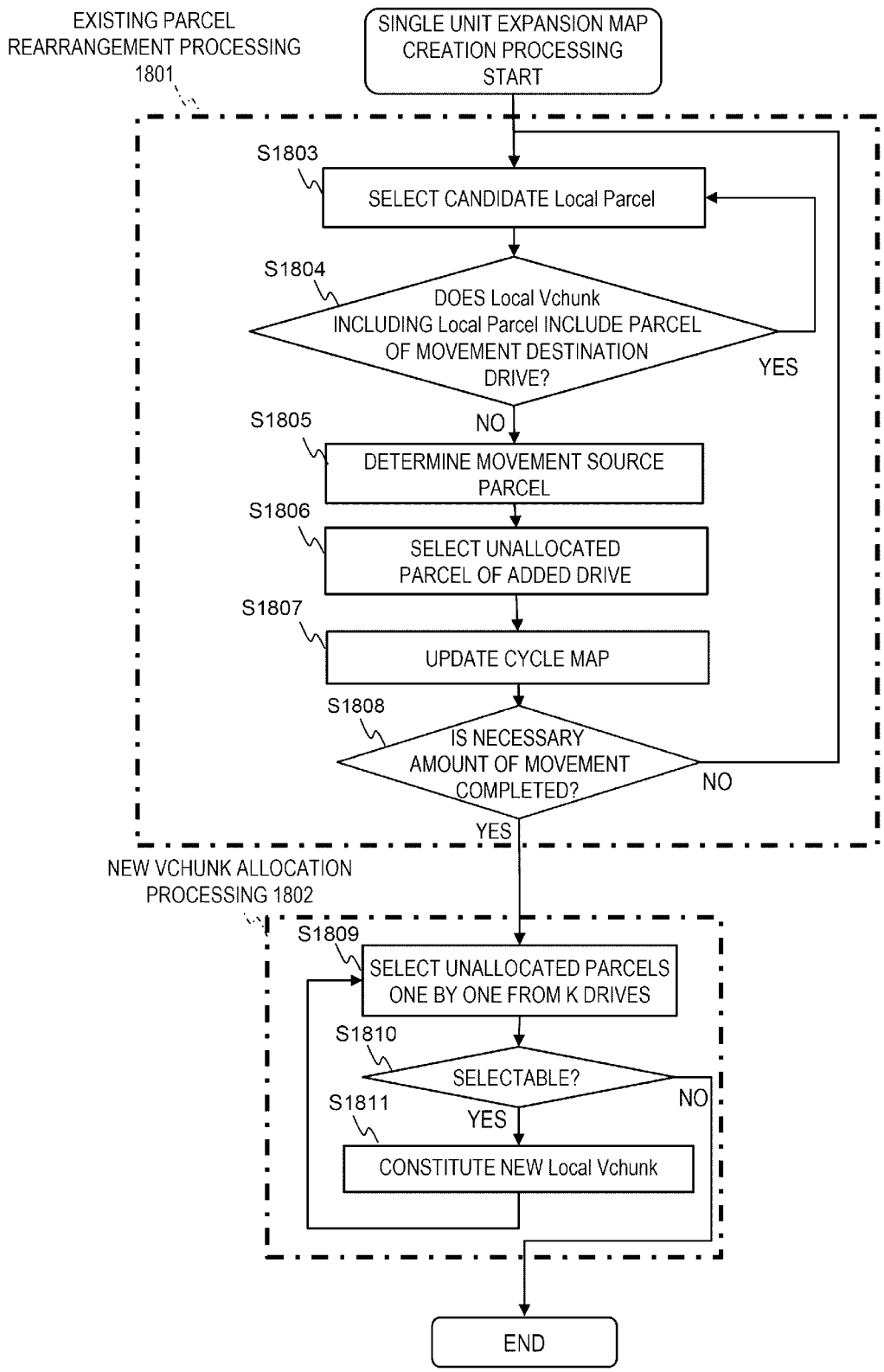
FIG. 18 is a flowchart showing single unit expansion map creation processing of FIG. 17.

FIG. 18 is a flowchart showing the single unit expansion map creation processing of FIG. 17.

In FIG. 18, the single unit expansion map creation processing includes existing parcel rearrangement processing 1801 of updating parcel information that constitutes the existing virtual chunk, and new Vchunk allocation processing 1802 of newly allocating the virtual chunk to the expanded capacity. Each processing will be described separately.

In the existing parcel rearrangement processing 1801, the single unit expansion map creation program 902 of FIG. 9 changes some of the existing virtual chunks 101 mapped to the physical parcels 109 in the existing drive 107 to a configuration using the physical parcels 109 of the added drive 1601, and updates the cycle mapping table 805.

First, the single unit expansion map creation program 902 selects one physical parcel 109 allocated to an existing Local Vchunk as a movement source candidate, and acquires Local Parcel # and PDEV # of the parcel (step S1803). The single unit expansion map creation program 902 may directly select the Local Parcel # and the PDEV #, and may acquire the corresponding Local Parcel # and PDEV # by referring to the cycle mapping table 805 after determining the target Local Vchunk # and VDEV #. Here, for example, in the single unit expansion map creation processing, the number of parcels selected as the movement source is selected so as to be leveled among the existing PDEVs 107. The selected physical parcel 109 is hereinafter referred to as a candidate parcel.

Next, the single unit expansion map creation program 902 determines whether the Local Vchunk including the candidate parcel includes the parcel in the added drive 1601 (step S1804). The single unit expansion map creation program 902 refers to the cycle mapping inverse conversion table 806 on the Target surface 806B, and acquires Local Vchunk # using the Local Parcel # and PDEV # of the candidate parcel acquired in step S1803 as keys.

Next, the single unit expansion map creation program 902 refers to the cycle mapping table 805 on the Target surface 805B, and acquires all VDEV #s that constitute the Local Vchunk # and the PDEVs of the parcels corresponding to the Local Vchunk # and VDEV # using the Local Vchunk # as a key. When at least one of the acquired PDEVs matches the PDEV # of the added drive 1601 (YES in step S1804), step S1803 is executed again.

When all the acquired PDEVs do not match the PDEVs of the added drive 1601 (NO in step S1804), the single unit expansion map creation program 902 determines the candidate parcel as a movement source parcel (step S1805).

Next, the single unit expansion map creation program 902 selects an unallocated parcel in the cycle mapping table 805 from the physical parcels of the added drive 1601 and confirms the unallocated parcel as a movement destination parcel (step S1806). The method for determining whether or not the parcel is unallocated is not particularly limited. For example, the determination may be made by using a table that manages the allocated and unallocated state for each Parcel #, or the Parcel # in the unallocated state may be managed in queue and the unallocated parcel may be acquired by referring to the queue.

Next, the single unit expansion map creation program 902 updates configuration information of the virtual chunk 101 including the movement source parcel so as to include the movement destination parcel (step S1807). At this time point, the single unit expansion map creation program 902 refers to the cycle mapping inverse conversion table 806 on the Target surface 806B, and acquires Local Vchunk # and VDEV # using the movement source Local Parcel # and PDEV # as keys. Next, Local Parcel # 1303 and PDEV # 1304 that can be acquired using the acquired Local Vchunk # and VDEV # as keys are updated to the Local PDEV # and PDEV # of the movement destination parcel, respectively. Further, the single unit expansion map creation program 902 updates the cycle mapping inverse conversion table 806 on the Target surface 806B in accordance with the cycle mapping table 805. At this point, since the movement source parcel does not constitute the Local Vchunk, invalid values are stored in the Local Vchunk 1403 and VDEV # that can be acquired using the Local Parcel # and PDEV # of the movement source parcel as keys.

Next, the single unit expansion map creation program 902 determines whether or not the existing parcel is moved sufficiently (step S1808). When the number of parcels moved to the added drive 1601 is less than the above-mentioned movement amount T (NO in step S1808), the single unit expansion map creation program 902 returns to step S1803 and performs the processing.

When the number of parcels moved to the added drive 1601 is equal to or greater than the above-mentioned movement amount T (YES in step S1808), the single unit expansion map creation program 902 moves the processing to the new Vchunk allocation processing 1802.

In the new Vchunk allocation processing 1802, the single unit expansion map creation program 902 first tries to select unallocated physical parcels from K drives one by one (step S1809).

When the unallocated parcels can be selected (step S1810, YES), the single unit expansion map creation program 902 constitutes a new Vchunk with the selected K parcels (step S1811). The single unit expansion map creation program 902 adds an entry of a new Local Vchunk # to the cycle mapping table 805 on the Target surface 805B, and sets Local Parcels and PDEV #s of the selected K parcels for the K VDEV #s constituting the new Local Vchunk #. The cycle mapping inverse conversion table 806 on the Target surface 806B is also updated in accordance with the cycle mapping table 805. The method of selecting the K drives is not particularly limited, and, for example, the K drives may be selected from those having the larger number of unallocated parcels.

At the time point when the new Vchunk is constituted, the VPG # to which the new Vchunk is allocated is uniquely determined. The VPG # to which the Vchunk is allocated and the Cycle Vchunk # within the VPG are obtained by the following Formulas (7) and (8).

$$\text{VPG \#=Floor(LVC \#}/c) \tag{7}$$

$$\text{Cycle } V\text{chunk \#=LVC \# mod } c \tag{8}$$

In step S1810, when the K parcels cannot be selected (NO), the single unit expansion map creation program 902 ends the processing.

As described above, the mapping pattern constituting the virtual chunk 101 is created using the capacity of the added drive 1601. In the present embodiment, the entity of the single unit expansion map creation processing is described as the single unit expansion map creation program 902 in the storage controller 202, but a part or all of the processing may be performed by another entity. For example, a mapping pattern corresponding to the configuration may be created by a high-performance computer in advance, and the storage controller 202 can read and use the created mapping pattern. Accordingly, the load of the storage controller 202 can be reduced, and a mapping pattern with better characteristics can be used.

In this case, for example, the mapping pattern created in advance in the single unit expansion map creation program 902 is stored for each of constituent PDEVs, and instead of steps 1701 to 1705 in FIG. 17, a mapping pattern corresponding to each of the constituent PDEVs after the expansion is set on the Target surface 805B of the cycle mapping table 805.

Figure 19:
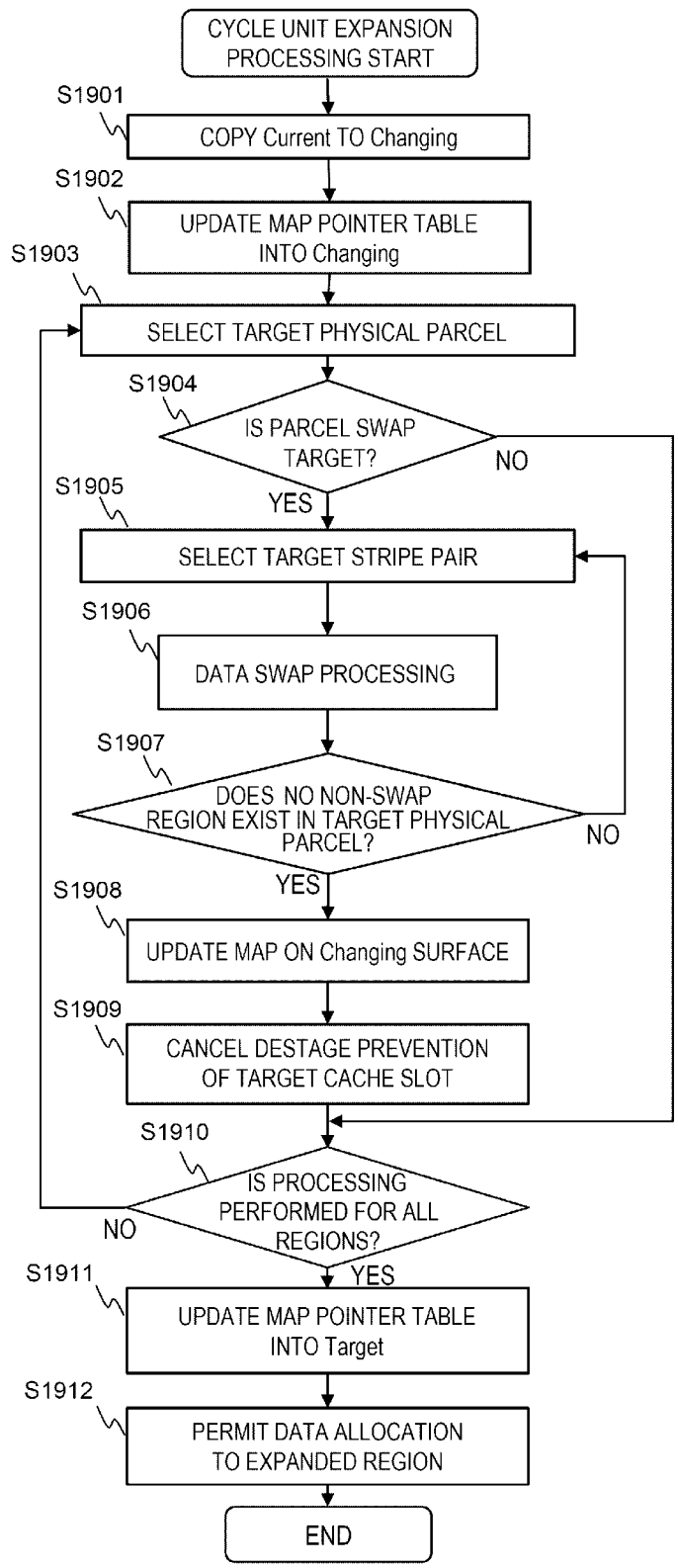
FIG. 19 is a flowchart showing cycle unit expansion processing of FIG. 17.

FIG. 19 is a flowchart showing the cycle unit expansion processing of FIG. 17.

In FIG. 19, the cycle unit expansion processing program 903 of FIG. 9 performs the cycle unit expansion processing in step S1706 of the drive expansion processing in FIG. 17. The cycle unit expansion processing is to change the arrangement of the data indicated by the current mapping pattern (Current) to the arrangement of the data indicated by the target mapping pattern (Target) by executing data SWAP processing to be described below.

First, the cycle unit expansion processing program 903 copies the Current surface 805A of the cycle mapping table 805 to the Changing surface 805C (step S1901), and updates an entry of the cycle map version 1203 of the cycle in the map pointer table 804 to Changing (step S1902).

Next, the cycle unit expansion processing program 903 sequentially selects one physical parcel in the cycle mapping table 805 to be expanded as a target physical parcel (step S1903). For example, the cycle unit expansion processing program 903 may select a physical parcel for which the data SWAP processing is not executed as the target physical parcel in an ascending order of PDEV # and Parcel # among the physical parcels in all drives in the cycle mapping table 805.

Next, the cycle unit expansion processing program 903 determines whether the target physical parcel is a SWAP target (step S1904). Specifically, when there is a difference between Local Vchunk # and VDEV # constituted by the target physical parcel with reference to the Current surface of the cycle mapping inverse conversion table 806 referenced by the DPG to be expanded, the target physical parcel is the SWAP target. Further, the physical parcel acquired by referring to the Target surface by using the Local Vchunk # and the VDEV # constituted by the SWAP target physical parcel on the Current surface as keys becomes a SWAP destination pair.

When it is determined that the target physical parcel is not the SWAP target (NO in step S1904), the cycle unit expansion processing program 903 moves the processing to step S1910. Step S1910 will be described below.

When it is determined that the target physical parcel is the SWAP target (YES in step S1904), the cycle unit expansion processing program 903 selects two Vchunks to which a SWAP target pair (SWAP source and SWAP destination) is allocated as a target Vchunk pair, and sequentially selects the virtual stripes in the target Vchunk pair as a target stripe pair (step S1905).

Next, the cycle unit expansion processing program 903 performs the data SWAP processing for the target stripe pair (step S1906). The data SWAP processing uses, for example, the processing disclosed in Patent Literature 1. The data SWAP processing is to exchange data between target stripe pairs when at least one of the target stripe pairs stores valid data.

For example, when at least one virtual stripe of the target stripe pair is allocated to the VVOL page, the data SWAP processing is to stage the data from the physical stripe corresponding to the virtual stripe to a target cache slot corresponding to the VVOL page in Current, prevents destage of the target cache slot (write from the CM 214 in FIG. 2 to the physical storage drive 107) and sets the target cache slot to dirty. When destage prevention is canceled after the data SWAP processing, the data stored in the target cache slot is asynchronously destaged to the physical stripe corresponding to the virtual stripe in Target.

Next, the cycle unit expansion processing program 903 determines whether a stripe (non-SWAP region) in which the data SWAP processing is not performed exists in the target physical parcel (step S1907). When the non-SWAP region exists (NO in step S1907), the cycle unit expansion processing program 903 returns to step S1905 and executes the same processing for a next physical stripe in the target physical parcel.

When it is determined that the non-SWAP region does not exist (YES in step S1907), the cycle unit expansion processing program 903 updates the information in the cycle mapping table 805 on the Changing surface to the parcel information after SWAP. Accordingly, even when the VP conversion processing for the cycle # which is a cycle unit expansion processing target is performed, a correct physical parcel can be accessed.

Next, the cycle unit expansion processing program 903 cancels the destage prevention of the target cache slot that is subjected to the destage prevention in step S1906 (step S1909).

Next, the cycle unit expansion processing program 903 determines whether all physical parcels in the cycle mapping table 805 to be expanded are selected as the target physical parcels (step S1910). When an unselected physical parcel exists (NO in step S1910), the cycle unit expansion processing program 903 returns to step S1903 and selects a next target physical parcel.

The SWAP target physical parcel may be freely determined according to I/O processing or the like. Normally, data cannot be allocated to the region where the data SWAP processing is not performed. However, for example, the data SWAP processing of the physical parcel corresponding to the region for which a write request is received from the host 204 in FIG. 2 may be preferentially performed to enable immediate data allocation to the expanded region.

In this case, during the data SWAP processing of a target region, the write data may be held as dirty data on the CM 214, and destage to the drive may be permitted on a time point when the data SWAP processing of the target region is completed.

When the unselected physical parcel does not exist (YES in step S1910), the cycle unit expansion processing program 903 updates the entry of the cycle map version 1203 of the cycle of the map pointer table 804 to Target (step S1911).

Next, the drive adding processing program 901 permits the allocation of the Vchunk corresponding to the target drive to the virtual volume, and ends the processing (step S1912). With the allocation permission, a value of the number of allocatable Vchunks 1003 associated with the corresponding VPG # in the pool management table 802 of FIG. 10 is increased. By performing the SWAP processing for each cycle and performing the allocation permission of the Vchunk to the virtual volume for each cycle, a part of the expanded capacity can be sequentially used until the completion of the entire expansion processing.

In the example of FIG. 19, although the data allocation to the expanded region is permitted after the data SWAP processing of the entire cycle is completed, the data allocation of the region may be permitted each time the data SWAP of a certain region in the cycle is completed. Accordingly, the expanded capacity can be used for each smaller capacity.

According to the above cycle unit expansion processing, when the valid data is stored in the Vchunk corresponding to the SWAP target physical parcel, the storage controller 202 reads the valid data from the physical parcel corresponding to the Vchunk based on Current, and writes the valid data to the physical parcel corresponding to the Vchunk based on Target. Accordingly, the storage controller 202 can move the data in accordance with the change of the mapping pattern from Current to Target.

In the cycle unit expansion processing, the storage controller 202 may sequentially select virtual chunks or virtual parcels instead of sequentially selecting the physical parcels.

Figure 20:
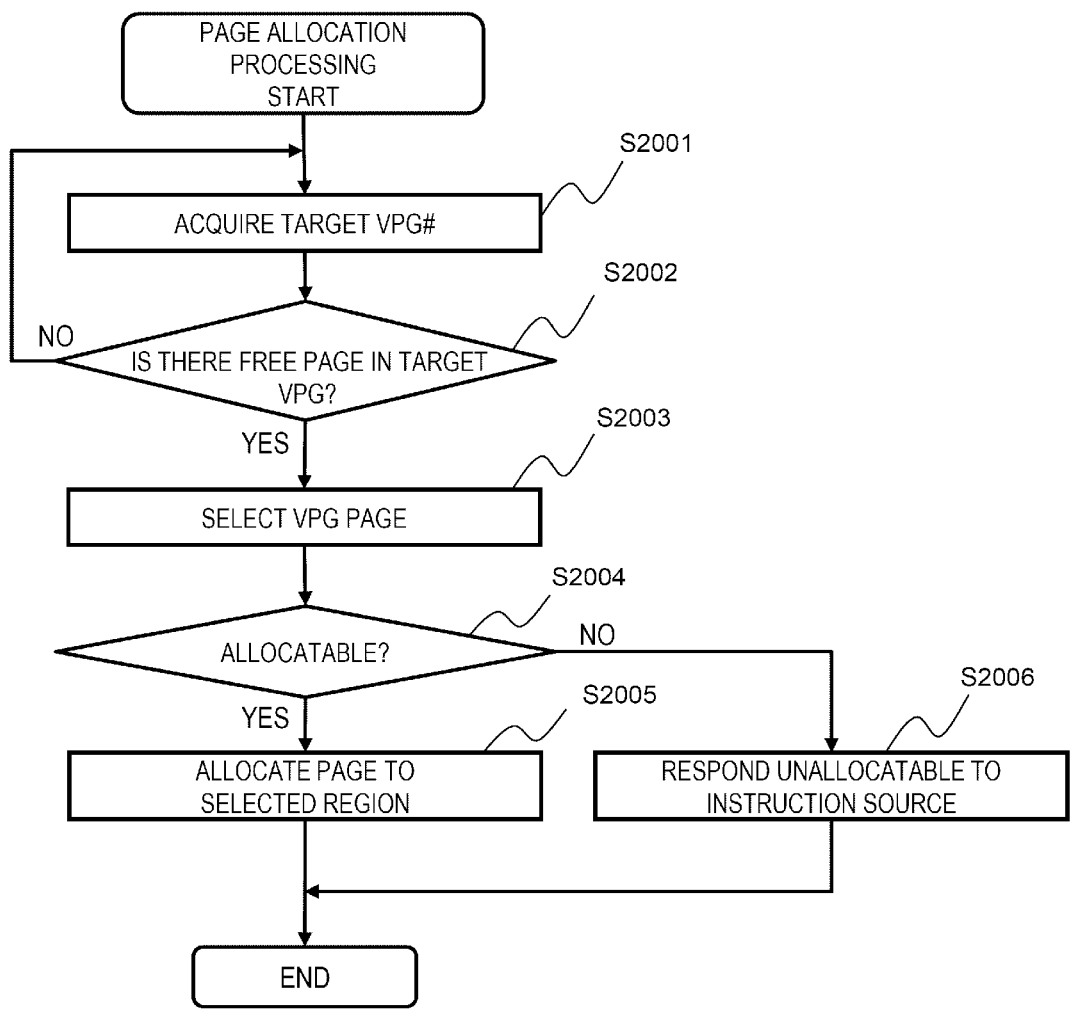
FIG. 20 is a flowchart showing allocation processing executed in the storage system of FIG. 2.

FIG. 20 is a flowchart showing the allocation processing executed in the storage system of FIG. 2.

In FIG. 20, the page allocation processing program 904 of FIG. 9 executes page allocation processing as a part of write processing from the host 204 of FIG. 2 when the VPG page 304 is unallocated to the VVOL page 303 to be written.

The page allocation processing program 904 determines whether the VPG page is allocated or unallocated to a target VVOL page based on the page mapping table 803 of FIG. 11. When the VPG page is unallocated to the target VVOL page, since information such as "unallocated" or "Not-Allocate" is stored in the VPG Page # 1105 of the page mapping table 803, the page allocation processing program 904 can determine whether the target page is unallocated. In an initial state of the system (a state in which the host I/O is not executed once for the virtual volume 302), all pages in the virtual volume 302 are "Not-Allocate".

First, the page allocation processing program 904 acquires a target VPG # (step S2001). As a method of selecting the target VPG, for example, a VPG with a lowest utilization rate may be selected as the target VPG, an allocation priority for each virtual volume 302 may be set to the VPG, and the VPG having a highest allocation priority may be selected as the target VPG.

Next, the page allocation processing program 904 determines whether or not a free page exists in the target VPG (step S2002). Here, the page allocation processing program 904 determines whether or not the free page exists by referring to the page mapping table 803 and confirming whether or not the unallocated VPG Page # 1105 exists in the target VPG.

When the free page does not exist in the target VPG (NO in step S2002), the page allocation processing program 904 returns to step S2001, selects a different target VPG #, and performs the determination in step S2002 again. When the free page exists in the target VPG (YES in step S2002), the page allocation processing program 904 selects the target VPG page from within the target VPG (step S2003). As a method of selecting the target VPG page, for example, among the free pages in the target VPG, a lowest page of the VPG page # is selected as the target VPG page.

When the target VPG page cannot be selected even after executing the above processing for all VPGs (NO in step S2004), the page allocation processing program 904 responds to an instruction source of the page allocation processing as unallocatable (step S2006), and ends the processing.

When the target VPG page can be selected (YES in step S2004), in order to allocate the target VPG page to the VVOL page, the page allocation processing program 904 registers the target VPG page in an entry of the target VVOL page in the page mapping table 803 (step S2005), and ends the processing.

According to the above page allocation processing, the storage controller 202 can efficiently use the VPG space by allocating the necessary VPG page 304 to the VVOL page 303. Further, since it is not necessary to match the unit of host access data with the unit of distributed RAID, it is possible to efficiently perform the host access and the distributed RAID respectively.

The storage controller 202 may provide the VPG space to the host 204 instead of the VVOL space. In this case, the storage controller 202 does not have to use the page mapping table 803.

Figure 21:
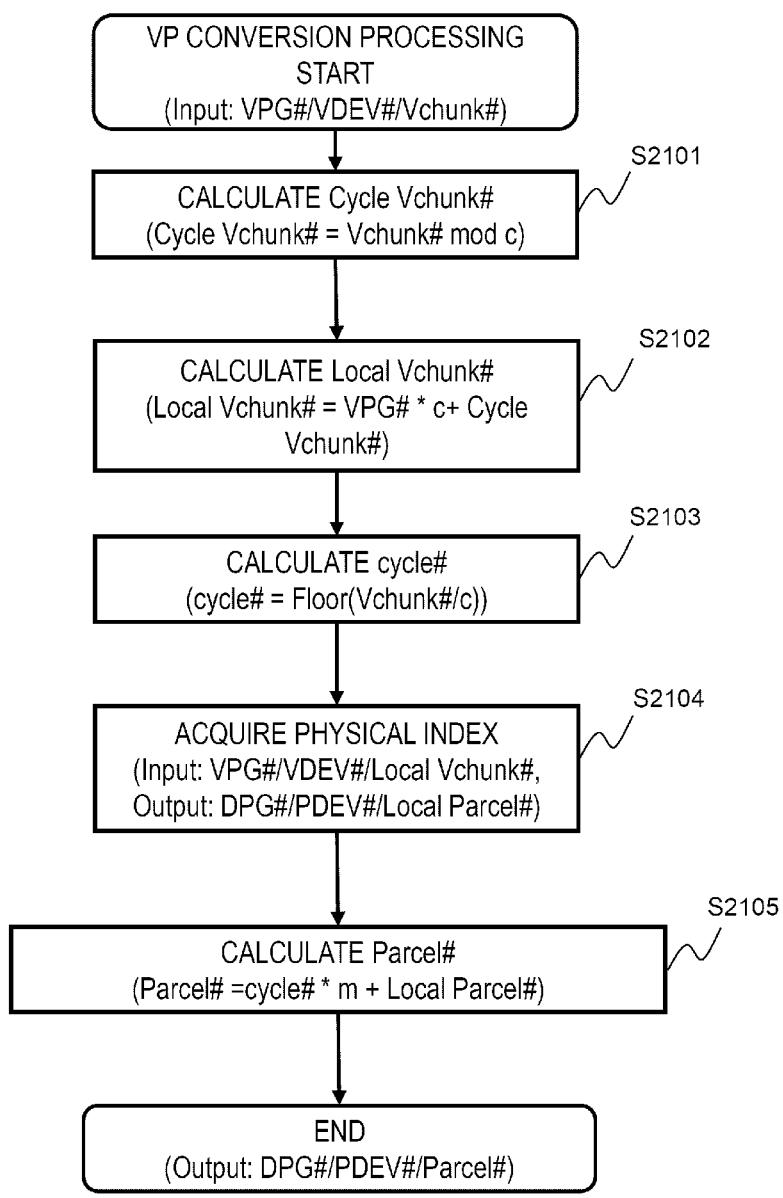
FIG. 21 is a flowchart showing VP conversion processing executed in the storage system of FIG. 2.

FIG. 21 is a flowchart showing VP conversion processing executed in the storage system of FIG. 2.

In FIG. 21, the VP (Virtual-Physical) conversion processing is executed by the VP conversion processing program 905 in FIG. 9. The VP conversion processing is conversion processing from an address in a logical storage region to an address in a physical storage region. The VP conversion processing is called by page conversion processing or the like when an I/O request is received from the host 204. The page conversion processing is to convert an address in a virtual volume designated by the I/O request into an address of the VPG space. The VP conversion processing is to convert an address (VPG #, VDEV #, Vchunk #) of the designated VPG space that is a virtual address into an address (DPG #, PDEV #, Parcel #) of a DPG space that is a physical data storage destination.

First, the VP conversion processing program 905 calculates Cycle Vchunk # based on Vchunk # (step S2101). Cycle Vchunk # can be calculated by Cycle Vchunk #=Vchunk # mod c.

Next, the VP conversion processing program 905 calculates Local Vchunk # based on VPG #, Cycle Vchunk #, and the number of period Vchunks c (step S2102). Local Vchunk # can be calculated by Local Vchunk #=VPG #×c+Cycle Vchunk #.

Next, the VP conversion processing program 905 calculates cycle # based on Vchunk # (step S2103). cycle # can be calculated by cycle #=Floor (Vchunk #/c).

Next, the VP conversion processing program 905 executes physical index acquisition processing (step S2104).

The physical index acquisition processing is processing of acquiring DPG #, PDEV # and Local Parcel # by using VPG #, VDEV # and Local Vchunk # as input.

For example, the VP conversion processing program 905 acquires the DPG # from the VPG # using the PG mapping (V2P) table 807 of FIG. 15A.

Next, the VP conversion processing program 905 refers to the map pointer table 804 in FIG. 12, specifies the cycle map version 1203 using the DPG # and the cycle # as keys, and determines a surface of the cycle mapping table 805 to refer to.

Next, the VP conversion processing program 905 acquires PDEV # and Local Parcel # based on VDEV # and Local Vchunk # using the cycle mapping table 805 of FIG. 13.

Next, the VP conversion processing program 905 calculates Parcel # based on Local Parcel #, Cycle #, and the number of period Parcels m, and ends the processing (step S2105). Parcel # can be calculated by Parcel #=Cycle #*m+Local Parcel #.

Figure 22:
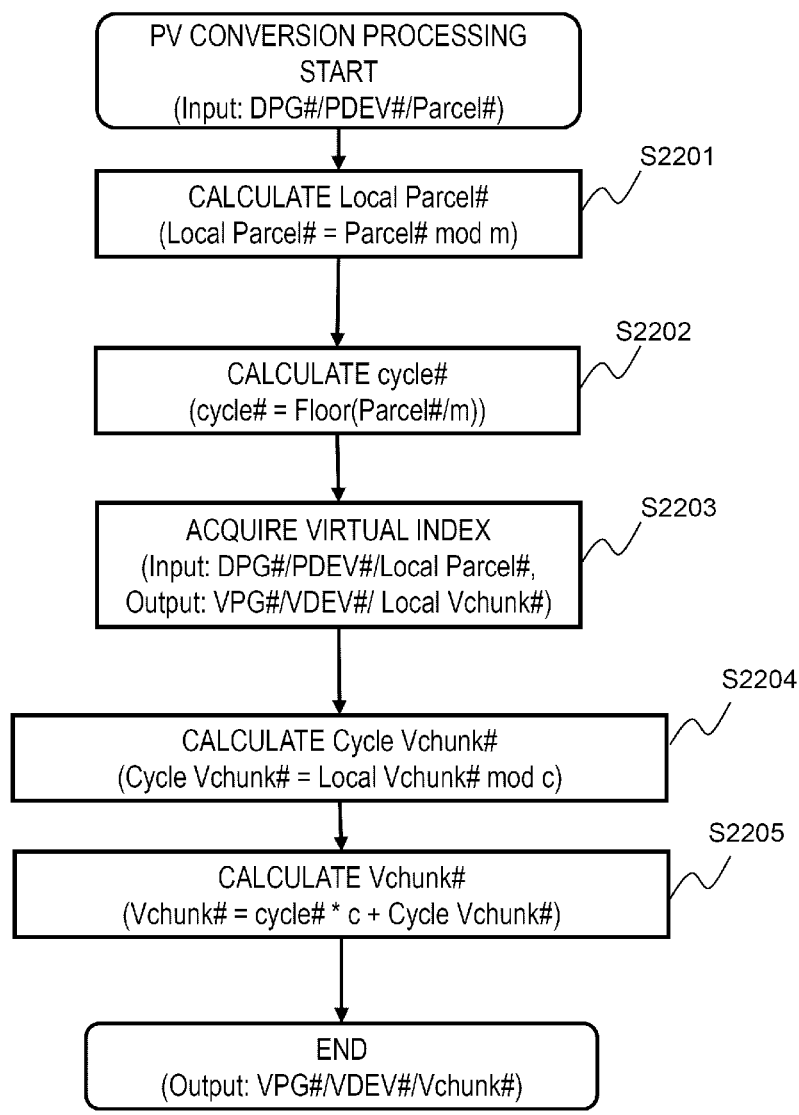
FIG. 22 is a flowchart showing PV conversion processing executed in the storage system of FIG. 2.

FIG. 22 is a flowchart showing the PV conversion processing executed in the storage system of FIG. 2.

In FIG. 22, the PV (Physical-Virtual) conversion processing is executed by the PV conversion processing program 906 in FIG. 9. The PV conversion is conversion processing from a physical storage region to a logical storage region. The PV conversion is, for example, processing used for specifying data corresponding to a failed physical storage region in rebuild processing. The PV conversion is to convert an address (DPG #, PDEV # and Parcel #) of the DPG space that is a designated physical data storage destination to an address (VPG #, VDEV # and Vchunk #) of the VPG space that is a virtual address. The PV conversion corresponds to inverse conversion of the VP conversion. In other words, when the PV conversion is performed after the VP conversion is performed, the same address is returned. The converse is also the same.

First, the PV conversion processing program 906 calculates Local Parcel # based on Parcel # (step S2201). Local Parcel # can be calculated by Local Parcel #=Parcel # mod (m).

Next, the PV conversion processing program 906 calculates cycle # based on Parcel # (step S2202). cycle # can be calculated by cycle #=Floor (Parcel #/m).

Next, the PV conversion processing program 906 refers to the map pointer table 804 in FIG. 12, specifies the cycle map version 1203 using the DPG # and cycle # as keys, and determines a surface of the cycle mapping table 805 to refer to.

Next, the PV conversion processing program 906 executes virtual index acquisition (step S2203). The virtual index acquisition is processing of acquiring VPG #, VDEV #, and Local Vchunk # by using DPG #, PDEV #, and Local Parcel # as input.

For example, the PV conversion processing program 906 acquires the VPG # based on the DPG # using the PG mapping (P2V) inverse conversion table 808 in FIG. 15B, and acquires VDEV # and Local Vchunk # based on PDEV # and Local Parcel # using the cycle mapping inverse conversion table 806 of FIG. 14. In the PV conversion, when VDEV # and Local Vchunk # are not allocated, the parcel is a spare region and indicates that no data is allocated.

Next, the PV conversion processing program 906 calculates Cycle Vchunk # based on Local Vchunk #, Cycle #, and the number of period Vchunks c (step S2204). Cycle Vchunk # can be calculated by Cycle Vchunk #=Local Vchunk # mod c.

Next, the PV conversion processing program 906 calculates Vchunk # based on Cycle Vchunk #, Cycle #, and the number of period Vchunks c, and ends the processing (step S2205). Vchunk # can be calculated by Vchunk #=Cycle ##c+Cycle Vchunk #.

According to the PV conversion processing described above, in the rebuild processing, the storage controller 202 can convert the address of the DPG space of the failed drive 107 into the address of the VPG space and specify the data necessary for the rebuild.

Although the method of adding a single drive is described in the present embodiment, it is also possible to perform processing of removing a single drive by using the same concept.

At the time of removing, new write is prohibited for the drive to be removed in the entire VPG # 4 to be deleted at the time of removing, and then data stored in the drive VPG # 4 to be removed is transferred to a VPG other than the VPG # 4 to be removed. Thereafter, the method shown in FIG. 16 is executed in reverse to generate a mapping pattern after the removing. The mapping pattern after removing eliminates the virtual parcels 103 mapped to the physical parcels 109 in the PDEV # 4. After the generation of the mapping pattern after the removing, cycle unit expansion processing of FIG. 19 is performed, and a drive to be removed is deleted from the system after the cycle unit expansion processing is completed for all cycles.

Further, in the present embodiment, although the method of adding drives from N to (N+1) is described, it is possible to create a mapping when a new DPG including (N+1) drives is newly created by using the same concept. For example, assuming that a VPG width is K, by creating a mapping pattern for a DPG with K drives in advance, and successively creating (K+1) mapping patterns, (K+2) mapping patterns . . . , (N+1) mapping patterns can be finally obtained.

Further, in the present embodiment, although an example in which the data exists in the existing drive region is shown, when the data is not stored, such as when a DPG is newly constituted, a part of the processing may not be performed. For example, in FIG. 19, the data can be stored without performing step S1903 to step S1910.

According to the data movement method at the time of adding one drive shown in the present embodiment, it is possible to use the expanded capacity with a data movement amount equal to or less than the capacity increased by the added drive.

Next, a data movement method at the time of adding one drive according to a second embodiment will be shown. In the following description, differences from the first embodiment are mainly described based on the first embodiment.

FIG. 23 is a block diagram showing a parcel mapping method when one physical storage drive used in a storage system according to a second embodiment is added.

In FIG. 23, an example in which one drive is added to change the number of drives into 5 from the state where the number of drives is 4 in the configuration where the number of period Parcels is m=4 and the number of drives is N=4 is shown using only a difference from the example of FIG. 16. P1 indicating a current mapping pattern, which is an initial mapping pattern before the drive is added, is the same as the example in FIG. 16 and is omitted.

P2 indicates a mapping pattern during the drive adding. Apart of the physical parcels 109 to which the virtual parcels 103 constituting the existing virtual chunks 101 are mapped is allocated to the added physical storage drive 1601. Accordingly, in the existing physical storage drives 107, the physical parcels 109 that are not mapped to the virtual parcels 103 constituting the existing virtual chunks 101 can be created.

In the example of FIG. 23, for each Parcel cycle, the physical parcels 109 to be moved by 1 Parcel are selected from four of the four existing physical storage drives 107, and a total of four physical parcels 109 are moved, and the movement amount depends on the number of period Parcels, the number of reserved parcels in the period Parcels, and the number of Parcels constituting the virtual chunk 101. The movement amount T is expressed by the following Formula (9) with the number of period Parcels being m, the number of reserved parcels in the period Parcels being S, and the number of VPG drives being K.

$$T = K \times (m-s)/K = (m-s) \quad (9)$$

The movement amount T of the example of FIG. 16 is given by Formula (5), and the movement amount T of the example of FIG. 23 is given by Formula (9). Therefore, the movement amount T in the example of FIG. 23 increases as compared with the example of FIG. 16.

At P3, a new VChunk is created. The new Vchunk is constituted by parcels that are not mapped to the virtual chunk 101 generated by the above-described existing Vchunk reconstruction processing.

At this time, by moving a total of four physical parcels 109 from four of the four existing drives 107 to the added drive 1601 for each Parcel cycle 603, four physical parcels 109 that are not mapped to the existing drive 107 are created. Therefore, it is possible to constitute the new Vchunk including four virtual parcels 103 for each Parcel cycle 603. FIG. 23 shows an example in which one new chunk is constituted by four virtual parcels 103 each having a Vchunk identifier "4-0" and one new chunk is constituted by four virtual parcels 103 each having a Vchunk identifier of "4-1" in respective Parcel cycles 603 of the existing drives 107.

The example of FIG. 23 is different from the example of FIG. 16 in that the new Vchunk is constituted using only the parcels of the existing drives 107. The number of new Vchunks for each Parcel cycle is given by the above Formula (6).

Thereafter, the storage controller 202 performs the parcel movement processing for moving data according to the mapping pattern, and ends the adding processing. After the parcel movement processing is completed, the storage controller 202 permits all VPG pages in the new VChunk to be allocated to VVOL pages.

In the data movement shown in the present embodiment, the number of Vchunks that can be newly allocated is equal and the movement amount is increased as compared with the first embodiment. The data movement is used to improve mapping pattern characteristics after the drive is added as compared to the effect of reducing the data movement amount. The mapping pattern characteristic is, for example, performance of the host I/O or a distributed rebuild speed.

Further, although the example in which only one virtual chunk is increased for each cycle mapping table is shown, when the number of period Parcels m is large and a plurality of virtual chunks are increased for each cycle mapping table, the parcel may be selected so as to have an intermediate movement amount between the movement amount shown in the first embodiment and the movement amount shown in the present embodiment. For example, when the number of Vchunks to be increased is two, seven parcels are moved from the existing PDEV, one virtual chunk may be constituted by selecting four parcels from the existing PDEV, and another virtual chunk may be constituted by selecting three parcels from the existing PDEV and one parcel from the added PDEV.

FIG. 24 is a block diagram showing a parcel mapping method when a plurality of physical storage drives used in a storage system according to a third embodiment is added.

In FIG. 24, in the first embodiment, when a plurality of drives are added, the mapping pattern after the plurality of drives are added is generated by repeating the operation of one drive adding a plurality of times, but in the present embodiment, by using a plurality of added drives as movement destination drives, the movement amount at the time of adding is reduced as compared with the case where one drive adding processing is repeated a plurality of times.

P1 indicates a current mapping pattern which is an initial mapping pattern before the drive is added. In the example of FIG. 24, two drives 1601A and 1601B for expansion are added together. In this state, the storage controller 202 cannot store the data since the data redundancy cannot be performed only in storage regions of the two added drives 1601A and 1601B. In the example of FIG. 24, only two Parcel cycles 603 are described for the sake of simplicity.

P2 indicates a mapping pattern during the drive adding. A part of the physical parcels 109 to which the virtual parcels 103 constituting the existing virtual chunks 101 are mapped is allocated to the two added drives 1601A and 1601B. Accordingly, in the existing drives 107, the physical parcel 109 that are not mapped to the virtual parcels 103 constituting the existing virtual chunks 101 can be created.

At this time, the storage controller 202 selects the virtual parcels 103 that are included in different virtual chunks 101 and are mapped to the existing drives 107 in each Parcel cycle 603, and changes the arrangement of the selected virtual parcels 103 to the two added drives 1601A and 1601B.

Here, when four different physical storage drives that provide the unallocated regions of the four virtual parcels that constitute the new chunk are to be secured, since two different physical storage drives can be secured from the added drives 1601A and 1601B, only two of the four existing drives 107 needs to be secured for the remaining two different physical storage drives. Therefore, for each new chunk, the arrangement of the virtual parcels 103 selected from two different existing drives 107 among the four existing drives 107 may be changed to the added drives 1601A and 1601B.

In the example of FIG. 24, in order to constitute two new chunks for each cycle map, the physical parcels 109 to be moved by 1 Parcel are selected from four of the four existing drives 107, and a total of four physical parcels 109 are moved to the two added drives 1601A and 1601B, and the movement amount depends on the number of period Parcels, the number of reserved parcels in the cycle Parcels, the number of Parcels constituting the Vchunk, and number of added drives. The movement amount T is expressed by the following Formula (10) with the number of period Parcels being m, the number of reserved parcels in the period Parcels being s, the number of VPG drives being K, and the number of added drives being A.

$$T = (K-A) \times (m-s)/K \times A \quad (10)$$

Here, A is an integer of 1 or more and less than K, and it can be seen that the value of T is smaller than that in the first embodiment. For example, when the number of added drives A is 2, it is necessary to repeat one drive adding twice in the method of FIG. 16, and 3×2=6 parcel movements for each Parcel cycle 603 occur. On the other hand, in the method of FIG. 24, since the two-drive adding is performed once at one time, four parcel movements for each Parcel cycle 603 can be completed, and the movement amount T can be reduced as compared with the method of FIG. 16.

At P3, a new VChunk is created. The new Vchunk is constituted by parcels that are not mapped to the virtual chunk 101 generated by the above-described existing Vchunk reconstruction processing. At this time, by moving a total of four physical parcels 109 from four of the four existing drives 107 to the two added drives 1601A and 1601B for each Parcel cycle 603, four physical parcels 109 that are not mapped to the existing drives 107 are created, and four physical parcels 109 that are not mapped to the added drives 1601A and 1601B are created. Therefore, two new Vchunks each including four virtual parcels 103 can be constituted for each Parcel cycle 603.

In the example of FIG. 24, since two drives are added, 4×2=8 virtual parcels 103 can be newly allocated for each Parcel cycle 603. FIG. 24 shows an example in which four virtual parcels 103 each having a Vchunk identifier "4-0" and four virtual parcels 103 each having a Vchunk identifier "5-0" are allocated to a first Parcel cycle 603, and four virtual parcels 103 each having a Vchunk identifier "4-1" and the four virtual parcels 103 each having a "5-1" are allocated to a second Parcel cycle 603.

Figure 25:
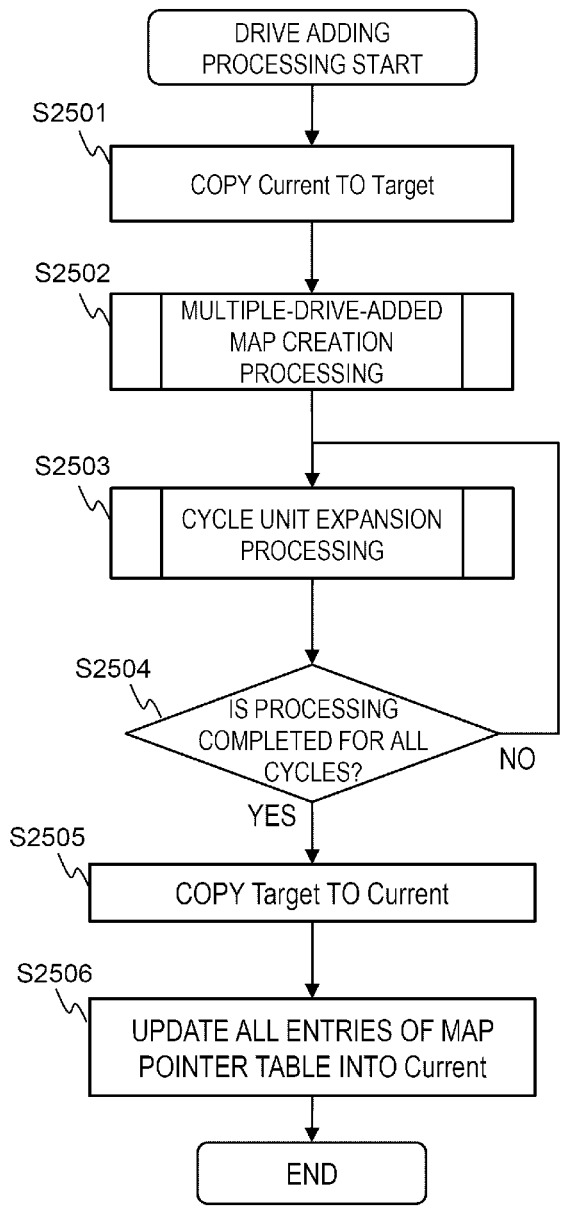
FIG. 25 is a flowchart showing an example of drive adding processing that can be applied when the plurality of physical storage drives used in the storage system according to the third embodiment are added.

FIG. 25 is a flowchart showing an example of drive adding processing that can be applied when the plurality of physical storage drives used in the storage system according to the third embodiment are added.

In FIG. 25, the drive adding processing is different from the drive adding processing in the first embodiment shown in FIG. 17 in that a series of processing from step S1702 to step S1704 is replaced with multiple-drive-added map creation processing (step S2502), other processing of steps S2501 and S2503 to step S2506 are the same as the processing of steps S1701 and S1706 to step S1709 of FIG. 17.

Figure 26:
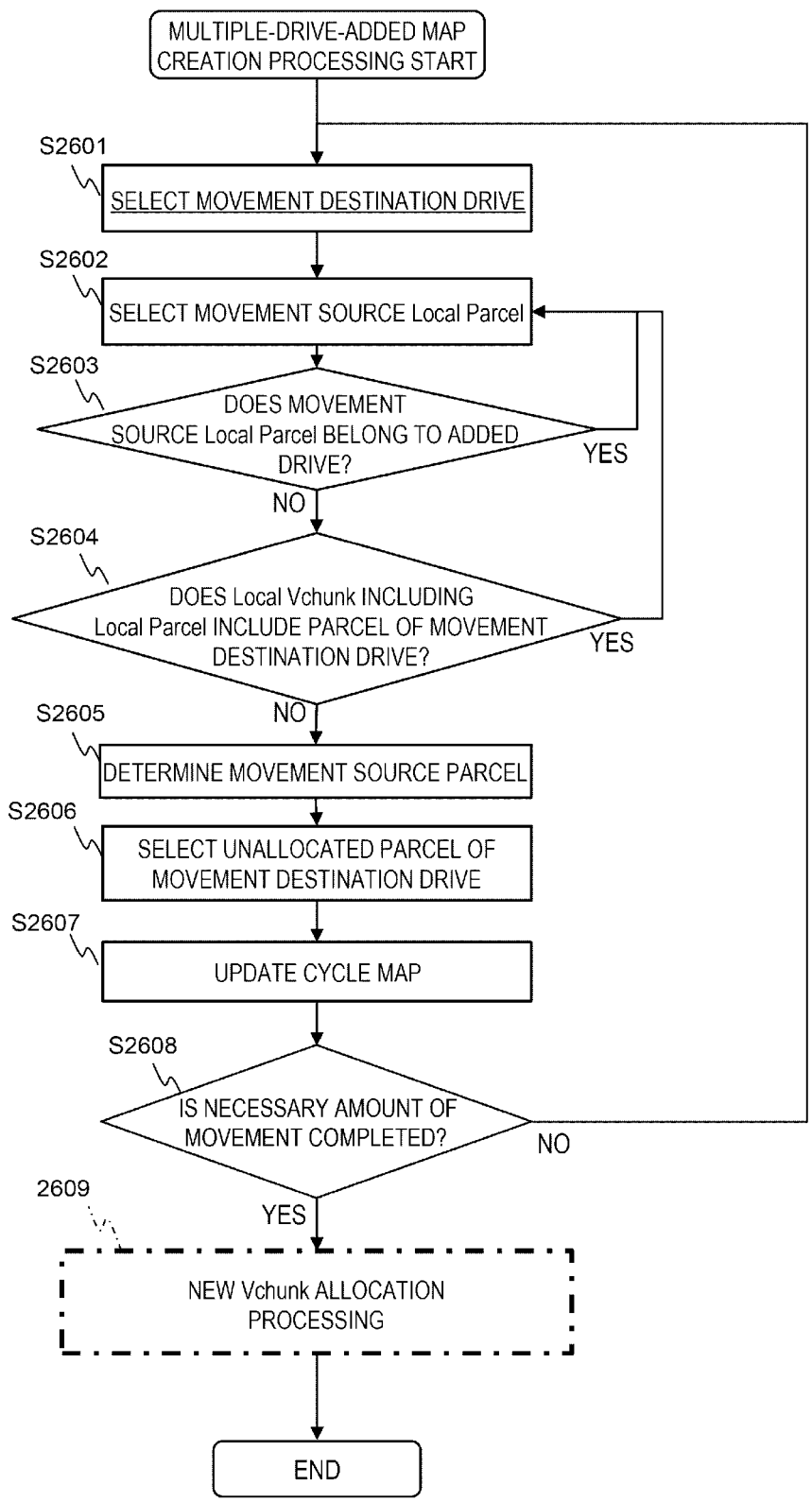
FIG. 26 is a flowchart showing a multiple-drive-added map creation processing of FIG. 25.

FIG. 26 is a flowchart showing the multiple-drive-added map creation processing of FIG. 25.

In FIG. 26, the drive adding processing program 901 of FIG. 9 first selects one of the plurality of added drives 1601 as a movement destination drive (step S2601). Although a selection criterion is not particularly limited, for example, the movement destination drive may be selected from the added drives 1601 in an ascending order of drive ID, or may be selected randomly using a random number or the like. The movement destination drive may be selected such that the number of selections may be equal among the added drives.

Next, the drive adding processing program 901 selects a movement source Local Parcel from the existing drives 107 (step S2602). The processing is the same as that of the first embodiment.

Next, the drive adding processing program 901 determines whether the selected Local Parcel belongs to the added drives 1601 (S2603). When the selected Local Parcel belongs to the added drives 1601 (YES in step S2603), the processing returns to step S2602 and the selection of Local Parcel is performed again. When the selected Local Parcel does not belong to the added drives 1601 (NO in step S2603), the processing moves to step S2604. Accordingly, data movement between the added drives 1601 can be prevented, which contributes to a reduction in the data movement amount.

The subsequent steps S2604 to S2607 are the same as those in the first embodiment.

Next, the drive adding processing program 901 determines whether or not the movement of the existing parcels is performed sufficiently (step S2608). When the number of the parcels moved to the added drives 1601 is less than the movement amount T of the Formula (10) (NO in step S2608), the drive adding processing program 901 returns to step S2601.

When the number of the parcels moved to the added drives is equal to or greater than the movement amount T of the Formula (10) (YES in step S2608), the drive adding processing program 901 moves the processing to the new Vchunk allocation processing 1802 (step S2609). The subsequent new Vchunk allocation processing is the same as that of the first embodiment.

As described above, when the number of added drives is less than the number of drives in the VPG, it is necessary to move the data from the existing drives in order to make the data redundant and use the added capacity. However, when the number of added drives is more than the number of drives in the VPG, it is possible to use the capacity without moving the data since the data redundancy can be made in only the added drives. In the following embodiments, a mapping pattern creation method for using the expanded capacity without data movement in a case where the number of added drives is more than the number of drives in the VPG will be described.

FIG. 27 is a block diagram showing a parcel mapping method when a plurality of physical storage drives used in a storage system according to a fourth embodiment is added.

In FIG. 27, P1 indicates a current mapping pattern which is an initial mapping pattern before the drive is added. FIG. 27 shows an example in which four drives for expansion 1601A to 1601D are added together. In the example of FIG. 27, only two Parcel cycles 603 are described for the sake of simplicity.

P2 indicates a temporary mapping pattern used temporarily. The storage controller 202 does not move the physical parcels 109 to which the virtual parcels 103 constituting the existing virtual chunks 101 are mapped, and constitutes a new Vchunk only by the parcels of the drives for expansion 1601A to 1601D. At this time, the four parcels constituting the same new Vchunk are mapped to different drives for expansion 1601A to 1601D, respectively. For example, four virtual parcels 103 each having a Vchunk identifier "4-0" are mapped to the drives for expansion 1601A to 1601D respectively, and four virtual parcels 103 each having a Vchunk identifier "5-0" are also mapped to the drives for expansion 1601A to 1601D respectively.

Accordingly, since it is not necessary to move data between the existing drives 107 in order to constitute the new Vchunk, the expanded capacity can be used immediately. However, when the new Vchunk is constituted by parcels that are mapped only to the drives for expansion 1601A to 1601D, the number of drives in which the parcels in the virtual chunk 101 are distributed is limited, and a rebuild speed improvement effect due to the distributed RAID configuration is reduced. For example, when the drive of PDEV #0 fails, the drive read in the rebuild processing is a drive of PDEV #1 to #3 only, and is not read from PDEV #4 to #7.

Therefore, the arrangement of P2 is temporary, and the final rearrangement to a mapping with a high distributed rebuild effect is performed (P3). Accordingly, it is possible to use the expanded capacity immediately and finally achieve an arrangement with a high rebuild speed. For example, when the drive of PDEV #0 fails, the drive read in the rebuild processing can be not only the drive of PDEV #1 to #3 but also the drive of PDEV #4 to #7, and the distributed rebuild effect can be improved.

Figure 28:
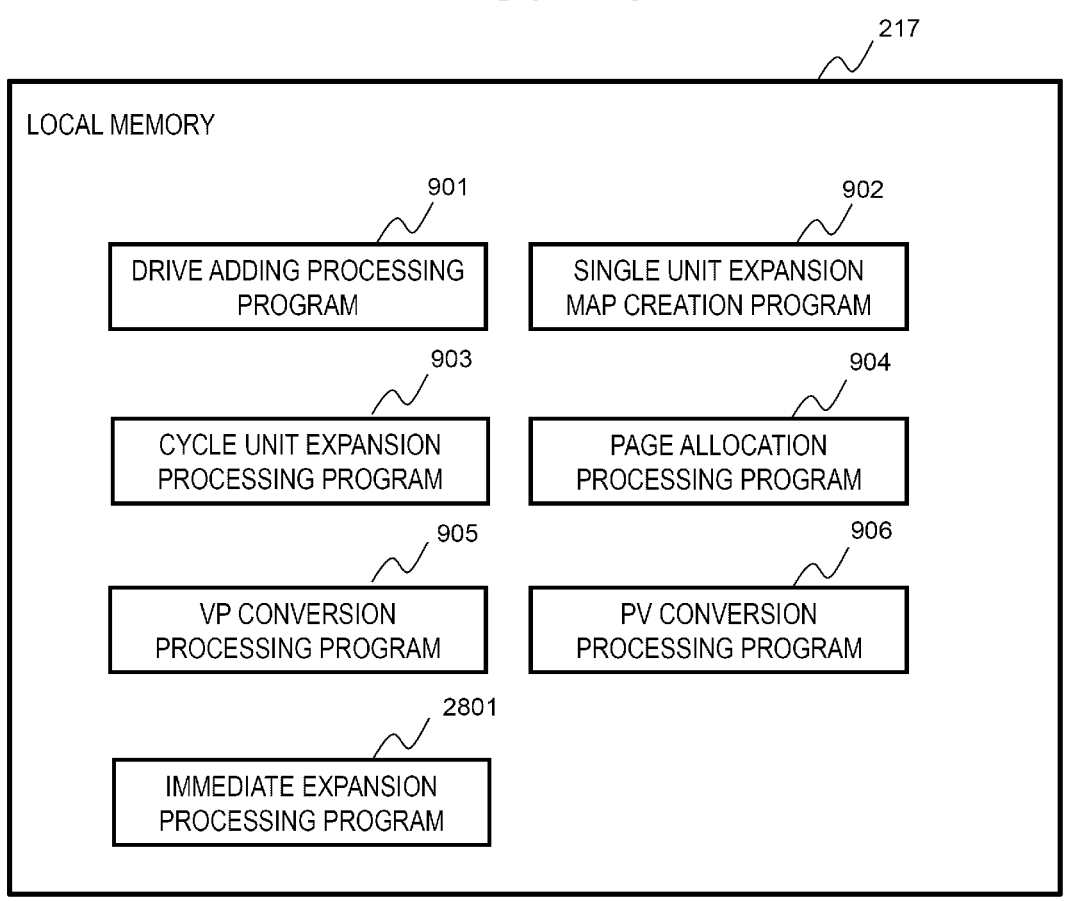
FIG. 28 is a block diagram showing contents of a local memory to be applied to the storage system according to the fourth embodiment.

FIG. 28 is a block diagram showing contents of a local memory applied to the storage system according to the fourth embodiment.

In FIG. 28, the local memory 217 stores an immediate expansion processing program 2801 in addition to the program described in the first embodiment.

Figure 29:
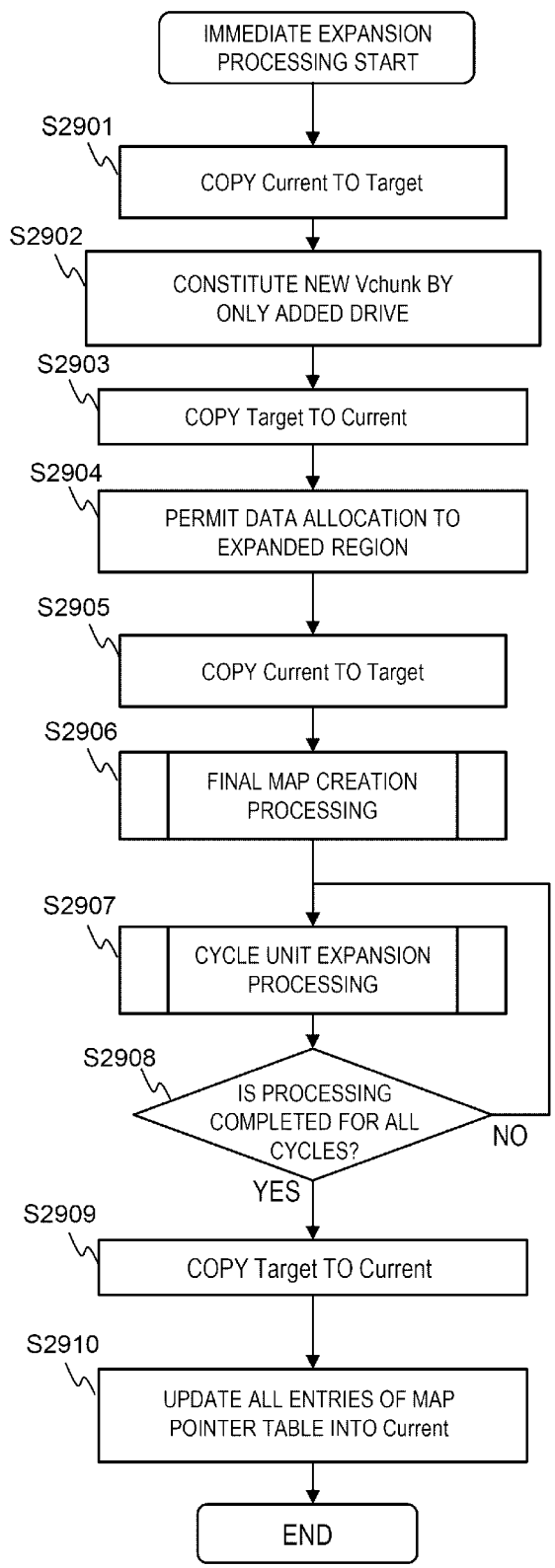
FIG. 29 is a flowchart showing immediate adding processing executed in the storage system according to the fourth embodiment.

FIG. 29 is a flowchart showing the immediate expansion processing executed in the storage system according to the fourth embodiment.

In FIG. 29, the immediate expansion processing program 2801 in FIG. 28 performs the adding processing when a plurality of drives equal to or greater than the number of drives in the VPG are added together. After adding the drive for expansion to the system, the administrator inputs an immediate expansion instruction for the DPG to the management server 203 of FIG. 2. The storage controller 202 executes the immediate expansion processing upon receipt of the expansion instruction from the management server 203. Alternatively, the management server 203 or the storage controller 202 may automatically execute the immediate expansion processing upon detection of the addition of the drives for expansion equal to or greater than the number of drives in the VPG for the system.

First, the immediate expansion processing program 2801 copies contents of the Current surface of the cycle mapping table 805 in FIG. 13 to the cycle mapping table 805 on the Target surface (step S2901).

Next, the immediate expansion processing program 2801 constitutes a new Vchunk only by Parcels in the added drive 1601, and updates the cycle mapping table 805 on the Target surface (step S2902).

Next, the immediate expansion processing program 2801 updates the cycle mapping table 805 on the Current surface to the cycle mapping table 805 on the Target surface (step S2903). Since only entries of the new Local Vchunk are added and the entries of the existing Local Vchunks are not updated before and after the cycle mapping table 805 of the Current surface is updated, so that the access to the existing data can be continued before and after the update.

Next, the immediate expansion processing program 2801 permits the new Vchunk to be allocated to the virtual volume (step S2904). With the allocation permission, specifically, a value of the number of allocatable Vchunks 1003 associated with the corresponding VPG # in the pool management table 802 of FIG. 10 is increased.

With the processing up to this point, the expanded capacity can be used. The subsequent processing may be continuously executed, may be executed with interruption at any timing, or the immediate expansion processing may be completed without executing the subsequent processing.

Next, the immediate expansion processing program 2801 copies contents of the Current surface of the cycle mapping table 805 to the cycle mapping table 805 of the Target surface (step S2905).

Next, the immediate expansion processing program 2801 performs final map creation processing (step S2906). In the final map creation processing, a mapping pattern corresponding to the number of drives in the DPG after the adding is created on the Target surface of the cycle mapping table 805. Although the generation method is not limited, for example, the mapping pattern may be generated by a method of repeating the one drive adding processing as shown in the first embodiment, or may be generated by using the multiple-drive-added map creation processing (S2502 in FIG. 25).

Next, the immediate expansion processing program 2801 performs the processing after the cycle unit expansion processing (step S2907). Subsequent processing is the same as the processing in step S1706 and subsequent steps shown in FIG. 17.

Figure 30:
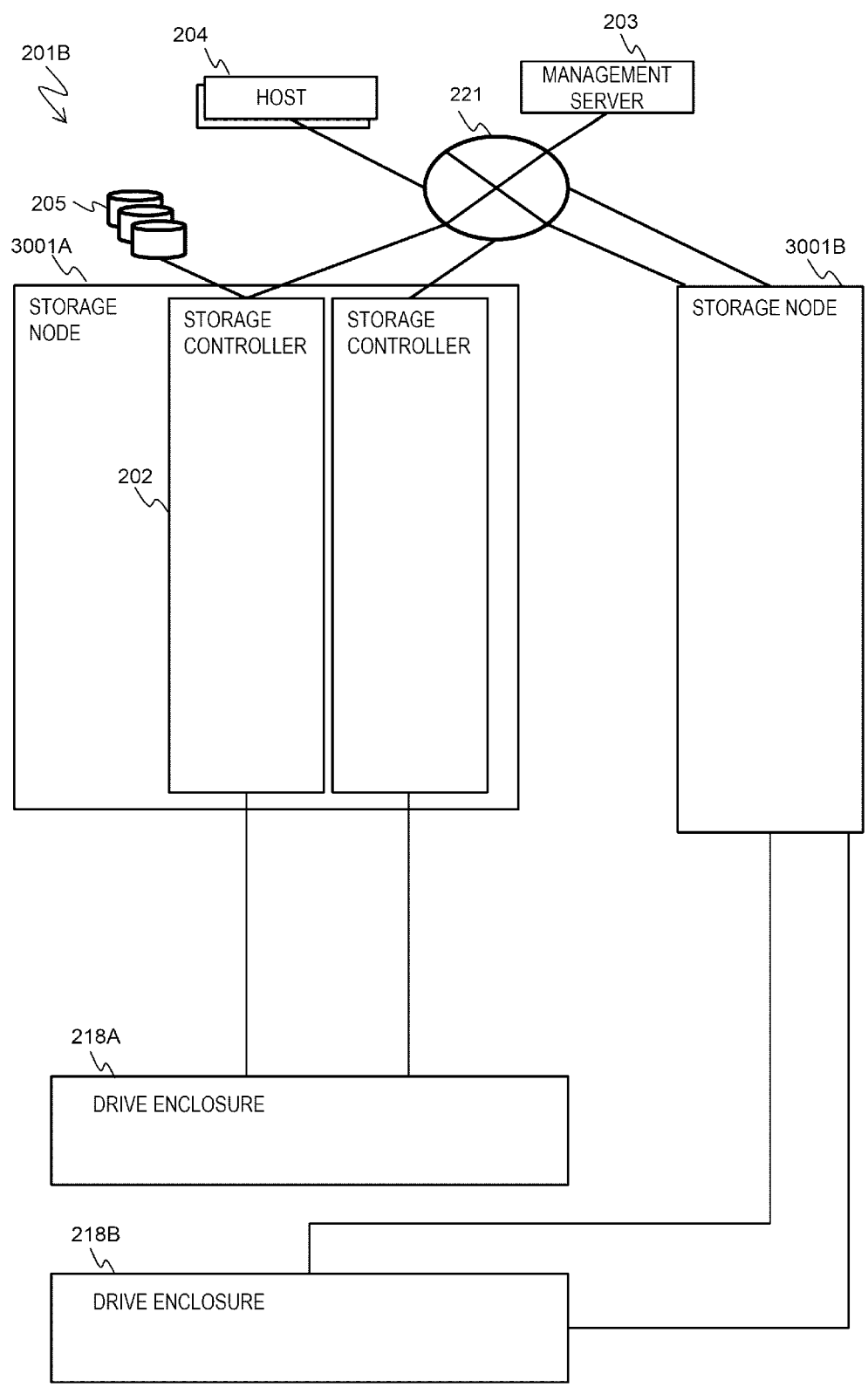
FIG. 30 is a block diagram showing a hardware configuration example of a storage system according to a fifth embodiment.

FIG. 30 is a block diagram showing a hardware configuration example of a storage system according to a fifth embodiment.

In FIG. 30, a computer system 201B includes one or more hosts 204, the management server 203, storage nodes 3001A and 3001B, and drive enclosures 218A and 218B. The storage node 3001A includes a plurality of storage controllers 202. The host 204, the management server 203, and the storage nodes 3001A and 3001B are connected via the network 221. The storage node 3001A is connected to the drive enclosure 218A, and the storage node 3001B is connected to the drive enclosure 218B.

The storage controller 202 manages a pool constituted by storage regions of a plurality of physical storage drives 107. The storage controller 202 constitutes a RAID group by using the storage regions in the pool. That is, the storage controller 202 constitutes a plurality of virtual parity groups (VPG) by using the plurality of physical storage drives 107.

In the present embodiment, the storage controller 202 may use a physical storage drive in the drive enclosure 218B connected to the storage node 3001B different from the storage node 3001A including the storage controller 202. That is, the storage controller 202 belonging to the storage node 3001A may constitute a virtual parity group by using the physical storage drive in the drive enclosure 218B. Also, the physical storage drive in the drive enclosure 218A and the physical storage drive in the drive enclosure 218B may be used to constitute a single virtual parity group.

The invention is not limited to the above-mentioned embodiments, and includes various modifications. For example, the above-mentioned embodiments have been described in detail for easy understanding of the present invention, and are not necessarily limited to those including all the configurations described above. In addition, a part of the configuration of one embodiment can be replaced with the configuration of another embodiment, and the configuration of another embodiment can be added to the configuration of the one embodiment. Another configuration can be added to, deleted from, and replaced with a part of the configuration of each embodiment. Further, the configurations, functions, processing units, processing means, or the like may be achieved by hardware by means of designing a part or all of them with, for example, an integrated circuit.

What is claimed is:

1. A storage system that reduces data movement when a capacity of the storage system is increased, the storage system comprising:
   a plurality of first physical storage drives,
   one or more processors that are communicatively coupled to the plurality of first physical storage drives, wherein the one or more processors are collectively configured to:
      form a plurality of virtual chunks with K virtual parcels, (K is an integer of 2 or more), each of the K virtual parcels having user data or element data that is redundant data for repairing the user data, allocate at least one virtual chunk out of the virtual chunks to a virtual volume provided to a host, respectively perform a mapping of virtual parcels included in a same virtual chunk to different first physical storage drives, and process a new virtual chunk in response to a number A of a second physical storage drives being added to the first physical storage drives to increase the capacity of the storage system, wherein A is an integer of 1 or more but less than K;

wherein the new virtual chunk is processed by:

selecting K-A existing virtual parcels from different virtual chunks that existed prior to adding the new virtual chunk, updating mapping location of the selected existing virtual parcels from regions in the first physical storage drives already allocated to the selected existing virtual parcels, to regions in the second physical storage drives, and forming the new virtual chunk with K additional virtual parcels by setting K additional virtual parcels to K unallocated regions collected both from K-A unallocated regions in the first physical storage drives in response to updating the mapping location of the selected existing virtual parcels and from A regions in the second physical storage drives.

2. The storage system according to claim 1, wherein once the new virtual chunk is provided to the virtual volume, an available capacity provided to the host is increased.

3. The storage system according to claim 2, wherein;

a predetermined number of the virtual chunks forms a virtual chunk group, a respective storage region on each of the plurality of first physical storage drives collectively forms a parcel cycle, wherein each respective storage region of the parcel cycle has a same predetermined capacity, the mapping includes mapping the virtual chunk group and the parcel cycle to each other, and a capacity of the virtual volume is sequentially increased by performing the mapping of the virtual parcels.

4. The storage system according to claim 3, wherein the parcel cycle is mapped by a common mapping pattern.

5. The storage system according to claim 1 the new virtual chunk is formed by updating the mapping so the new virtual chunk is associated with a region of the second physical storage drives.

6. The storage system according to claim 1, wherein A is 2 or more; and the new virtual chunk uses all the A added physical storage drives.

7. The storage system according to claim 1, wherein the one or more processors are further collectively configured to:

form a plurality of virtual parity groups from the K virtual parcels, wherein each of the virtual parity group includes c (c is a positive integer) virtual chunks, and form a period group from among the plurality of virtual parity groups, where the period group include E (E is a positive integer) virtual parity groups that each have a parcel cycle, and wherein the virtual parcels are periodically allocated among the first physical storage and the second physical storage based on the period group drives.

8. A storage management method for reducing data movement when a capacity of storage system is increased, the storage management method comprising:

forming a plurality of virtual chunks with K virtual parcels, (K is an integer of 2 or more), each of the K virtual parcels having user data or element data that is redundant data for repairing the user data, allocating at least one virtual chunk out of the virtual chunks to a virtual volume provided to a host, respectively performing a mapping of virtual parcels included in a same virtual chunk to a different first physical storage drive among first physical storage drives of the storage system, detecting a number A of second physical storage drives being added to the first physical storage drives to increase the capacity of the storage system, wherein A is an integer of 1 or more but less than K, and processing a new virtual chunk using the second physical storage drives, wherein the new virtual chunk is processed by:

selecting K-A existing virtual parcels from different virtual chunks that existed prior to adding the new virtual chunk, updating mapping location of the selected existing virtual parcels from regions in the first physical storage drives already allocated to the selected existing virtual parcels, to regions in the second physical storage drives, and forming the new virtual chunk with K additional virtual parcels by setting K additional virtual parcels to K unallocated regions collected both from K-A unallocated regions in the first physical storage drives in response to updating the mapping location of the selected existing virtual parcels and from A regions in the second physical storage drives.

9. A non-transitory computer readable storage medium storing instructions for reducing data movement when a capacity of storage system is increased, the instructions when executed by one or ore more processors cause the one or more processor to collectively execute a method comprising:

forming a plurality of virtual chunks with K virtual parcels, (K is an integer of 2 or more), each of the K virtual parcels having user data or element data that is redundant data for repairing the user data, allocating at least one virtual chunk out of the virtual chunks to a virtual volume provided to a host, respectively performing a mapping of virtual parcels included in a same virtual chunk to a different first physical storage drive among first physical storage drives of the storage system, and processing a new virtual chunk in response to a number A of second physical storage drives being added to the first physical storage drives to increase the capacity of the storage system, wherein A is an integer of 1 or more but less than K wherein the new virtual chunk is processed by:

selecting K-A existing virtual parcels from different virtual chunks that existed prior to adding the new virtual chunk, updating mapping location of the selected existing virtual parcels from regions in the first physical storage drives already allocated to the selected existing virtual parcels, to regions in the second physical storage drives, and forming the new virtual chunk with K additional virtual parcels by setting K additional virtual parcels to K unallocated regions collected both from K-A unallocated regions in the first physical storage drives in response to updating the mapping location of the selected existing virtual parcels and from A regions in the second physical storage drives.

* * * * *